US011011964B2

(12) United States Patent
Sato et al.

(10) Patent No.: US 11,011,964 B2
(45) Date of Patent: May 18, 2021

(54) CAGE INDUCTION MOTOR

(71) Applicants: CENTRAL JAPAN RAILWAY COMPANY, Nagoya (JP); Toshiba Infrastructure Systems & Solutions Corporation, Kawasaki (JP)

(72) Inventors: Kenji Sato, Nagoya (JP); Takafumi Fukushima, Nagoya (JP); Daisuke Misu, Tama (JP); Makoto Matsushita, Fuchu (JP); Toshio Hasebe, Hachioji (JP)

(73) Assignees: CENTRAL JAPAN RAILWAY COMPANY, Nagoya (JP); Toshiba Infrastructure Systems & Solutions Corporation, Kawasaki (JP)

( * ) Notice: Subject to any disclaimer, the term of this patent is extended or adjusted under 35 U.S.C. 154(b) by 294 days.

(21) Appl. No.: 16/301,957

(22) PCT Filed: May 19, 2017

(86) PCT No.: PCT/JP2017/018862
§ 371 (c)(1),
(2) Date: Nov. 15, 2018

(87) PCT Pub. No.: WO2017/200093
PCT Pub. Date: Nov. 23, 2017

(65) Prior Publication Data
US 2019/0288588 A1 Sep. 19, 2019

(30) Foreign Application Priority Data
May 19, 2016 (JP) .............................. JP2016-100933

(51) Int. Cl.
*H02K 17/16* (2006.01)
*H02K 1/32* (2006.01)
(Continued)

(52) U.S. Cl.
CPC ............... *H02K 17/16* (2013.01); *H02K 1/20* (2013.01); *H02K 1/28* (2013.01); *H02K 1/32* (2013.01)

(58) Field of Classification Search
CPC ................................ H02K 17/16; H02K 1/30; H02K 1/28; H02K 1/20; H02K 1/32
See application file for complete search history.

(56) References Cited

U.S. PATENT DOCUMENTS 6,133,663 A * 10/2000 Hoemann
2006/0022541 A1 * 2/2006 Ong .......................... H02K 1/28
310/156.53

(Continued)

FOREIGN PATENT DOCUMENTS

JP 56-35849 U 4/1981
JP 61-285037 A 12/1986
(Continued)

OTHER PUBLICATIONS

International Search Report dated Jul. 4, 2017 in PCT/JP2017/018862 Filed on May 19, 2017.

*Primary Examiner* — Naishadh N Desai
(74) *Attorney, Agent, or Firm* — Oblon, McClelland, Maier & Neustadt, L.L.P.

(57) ABSTRACT

A cage induction motor includes a rotor core that is rotatable about a central axis, and a shaft to which the rotor core is fixed. The rotor core includes an annular yoke and a plurality of spokes. The yoke supports at least one conductor. The plurality of spokes are arranged apart from one another in a circumferential direction of the yoke, are provided between the yoke and the shaft, and support the yoke.

18 Claims, 26 Drawing Sheets

(51) Int. Cl.
*H02K 1/28* (2006.01)
*H02K 1/20* (2006.01)

(56) References Cited

U.S. PATENT DOCUMENTS

| | | | |
|---|---|---|---|
| 2009/0200888 A1* | 8/2009 | Tanaka | H02K 3/12 |
| | | | 310/195 |
| 2015/0022042 A1* | 1/2015 | Han | H02K 1/2773 |
| | | | 310/156.23 |

FOREIGN PATENT DOCUMENTS

| | | |
|---|---|---|
| JP | 1-117635 A | 5/1989 |
| JP | 2001-211617 A | 8/2001 |
| JP | 2003-143800 A | 5/2003 |
| JP | 3930294 B2 | 6/2007 |
| JP | 2009-219343 A | 9/2009 |
| JP | 2010-252598 A | 11/2010 |
| JP | 2011-125193 A | 6/2011 |
| WO | WO 2011/114594 A1 | 9/2011 |

* cited by examiner

CAGE INDUCTION MOTOR

TECHNICAL FIELD

Embodiments of the invention relate to a cage induction motor.

BACKGROUND ART

In general, a cage induction motor includes a stator and a rotor that is disposed inside the stator and has conductors, and is variously used industrially and in railroads.

Meanwhile, cage induction motors are expected to be further reduced in weight.

PRIOR ART LITERATURE

Patent Literature

Patent Literature 1
Japanese Unexamined Patent Application No. 2003-143800
Patent Literature 2
Japanese Unexamined Patent Application No. 2001-211617

SUMMARY OF INVENTION

Issue to be Solved by Invention

Issue to be solved by the invention is to provide a cage induction motor in which weight reduction is possible.

Means for Solving the Issue

A cage induction motor of an embodiment includes a rotor core that is rotatable about a central axis, and a shaft to which the rotor core is fixed. The rotor core includes an annular yoke and a plurality of spokes. The yoke supports at least one conductor. The plurality of spokes are arranged apart from one another in a circumferential direction of the yoke, are provided between the yoke and the shaft, and support the yoke.

MODE FOR CARRYING OUT INVENTION

Hereinafter, cage induction motors of embodiments will be described with reference to the drawings. In the following description, the same reference signs are given to constitutions having substantially identical or similar functions. Duplicate description of these constitutions may be omitted. In some of the drawings shown below, for convenience of description, a housing of the motor is not illustrated.

First Embodiment

A cage induction motor 1 of a first embodiment will be described with reference to FIGS. 1 to 3.

Figure 1:
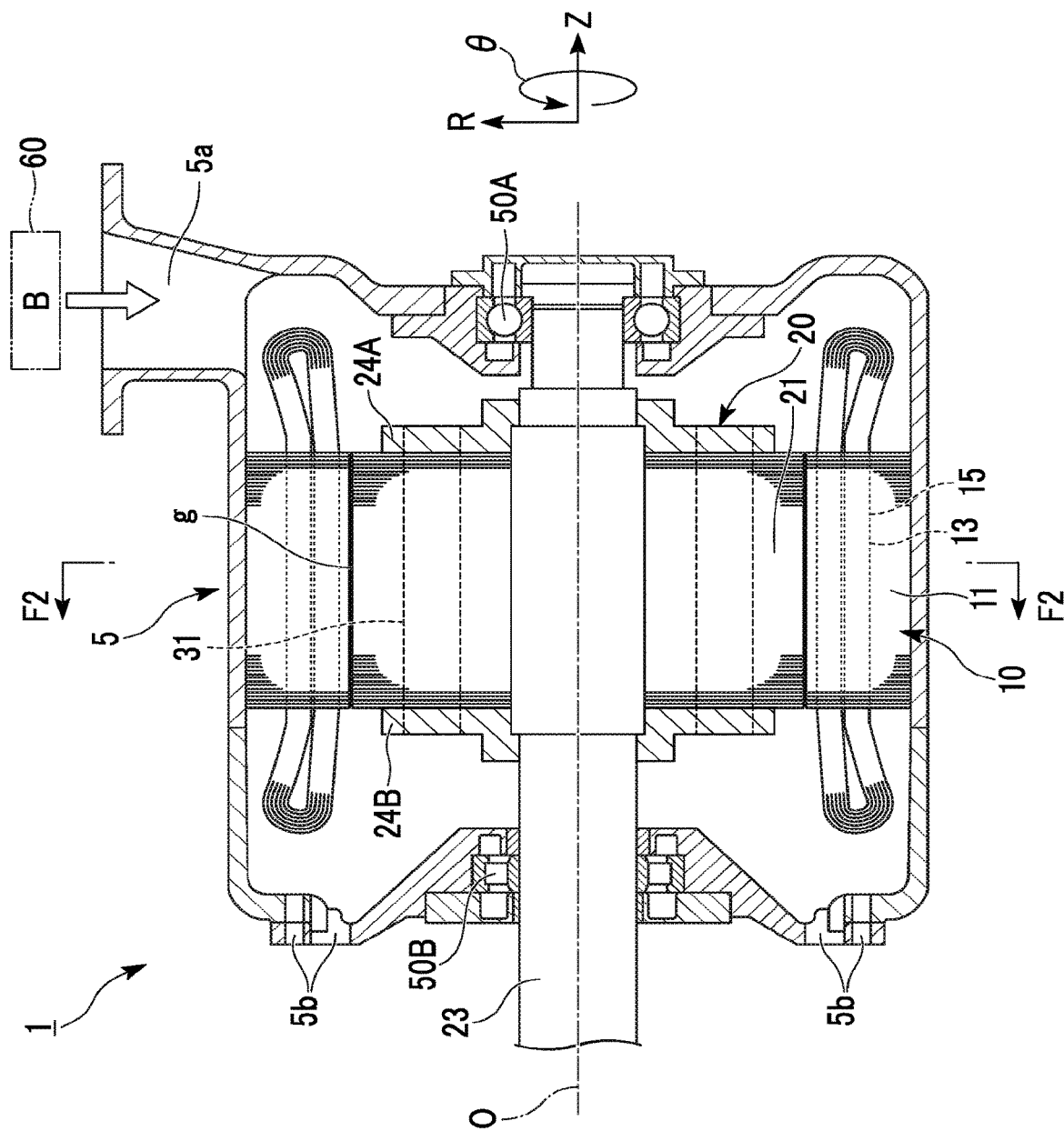
FIG. 1 is a sectional view of a motor of a first embodiment.

FIG. 1 is a sectional view illustrating the cage induction motor 1 of the present embodiment.

The cage induction motor 1 of the present embodiment (hereinafter referred to simply as "motor 1") is, for example, a motor that is mounted in a truck of a railroad vehicle, or the like and drives wheels. The motor 1 of the present embodiment is, for example, a 3-phase 6-pole motor. However, the number of poles of the motor 1 may be four, eight, or a number other than these numbers.

In the following description, a direction parallel to the central axis (hereinafter referred to as "central axis O") of rotation of the motor 1 is referred to as an axial direction Z, and a direction perpendicular to the central axis O is referred to as a radial direction R. A direction around the central axis O is referred to as a circumferential direction θ. The axial direction Z, the radial direction R, and the circumferential direction θ may also be called an axial direction, a radial direction, and a circumferential direction of a yoke 25 (to be described below), or an axial direction, a radial direction, and a circumferential direction of a rotor core 21.

First, an overall constitution of the motor 1 will be described.

As illustrated in FIG. 1, the motor 1 includes a housing 5, a stator 10, a rotor 20, bearings 50A and 50B, and a blower 60.

The housing 5 houses the stator 10 and the rotor 20, and has a first vent hole 5a and second vent holes 5b. The first vent hole 5a and the second vent holes 5b open on the outside of the housing 5. For example, the first vent hole 5a is an intake port which is provided at one end of the housing 5 in the axial direction Z and to which cooling air is supplied from the blower 60. On the other hand, the second vent holes 5b are exhaust ports which are provided at the other end of the housing 5 in the axial direction Z and through which the cooling air flowing through the inside of the housing 5 is exhausted to the outside of the housing 5. In this motor 1, the blower 60 is driven, and thereby the cooling air flows through the inside of the housing 5, and the stator 10 and the rotor 20 are cooled. Thereby, a cooling structure of a forced air cooling type of the motor 1 is realized. However, the motor 1 is not limited to the motor of the forced air cooling type, and may be a motor of a self-ventilating type in which a fan is mounted on a shaft 23 (to be described below) or a motor of a natural cooling type.

The stator 10 includes a stator core 11 and stator coils 13.

For example, a plurality of annular magnetic steel sheets are stacked in the axial direction Z, and thereby the stator core 11 is formed in a tubular shape that extends in the axial direction Z. The stator core 11 is disposed outside the rotor 20. A plurality of stator slots 15 that extend in the axial direction Z are provided at an inner circumferential portion of the stator core 11. The plurality of stator slots 15 are formed at regular intervals in the circumferential direction θ.

The stator coils 13 are inserted into the stator slots 15.

The rotor 20 includes a rotor core 21, a shaft 23, and pressing plates 24A and 24B.

For example, a plurality of annular magnetic steel sheets are stacked in the axial direction Z, and thereby the rotor core 21 is formed in a tubular shape that extends in the axial direction Z. An outer circumferential surface of the rotor core 21 faces an inner circumferential surface of the stator core 11 with a gap g in the radial direction R.

The shaft 23 is disposed with its axis coinciding with the central axis O of the motor 1, and is rotatably supported by the bearings 50A and 50B. The rotor core 21 is fixed to the shaft 23. Thereby, the rotor core 21 is disposed with its axis coinciding with the central axis O of the motor 1, and is provided to be rotatable about the central axis O.

The pressing plates 24A and 24B are fixed to the shaft 23. The pressing plates 24A and 24B are formed, for example, in plate shapes corresponding to end faces of the rotor core 21 in the axial direction Z. The pressing plates 24A and 24B are divided and located on opposite sides of the rotor core 21 in the axial direction Z, and hold the rotor core 21 from the opposite sides.

Next, the rotor core 21 of the present embodiment will be described in detail.

Figure 2:
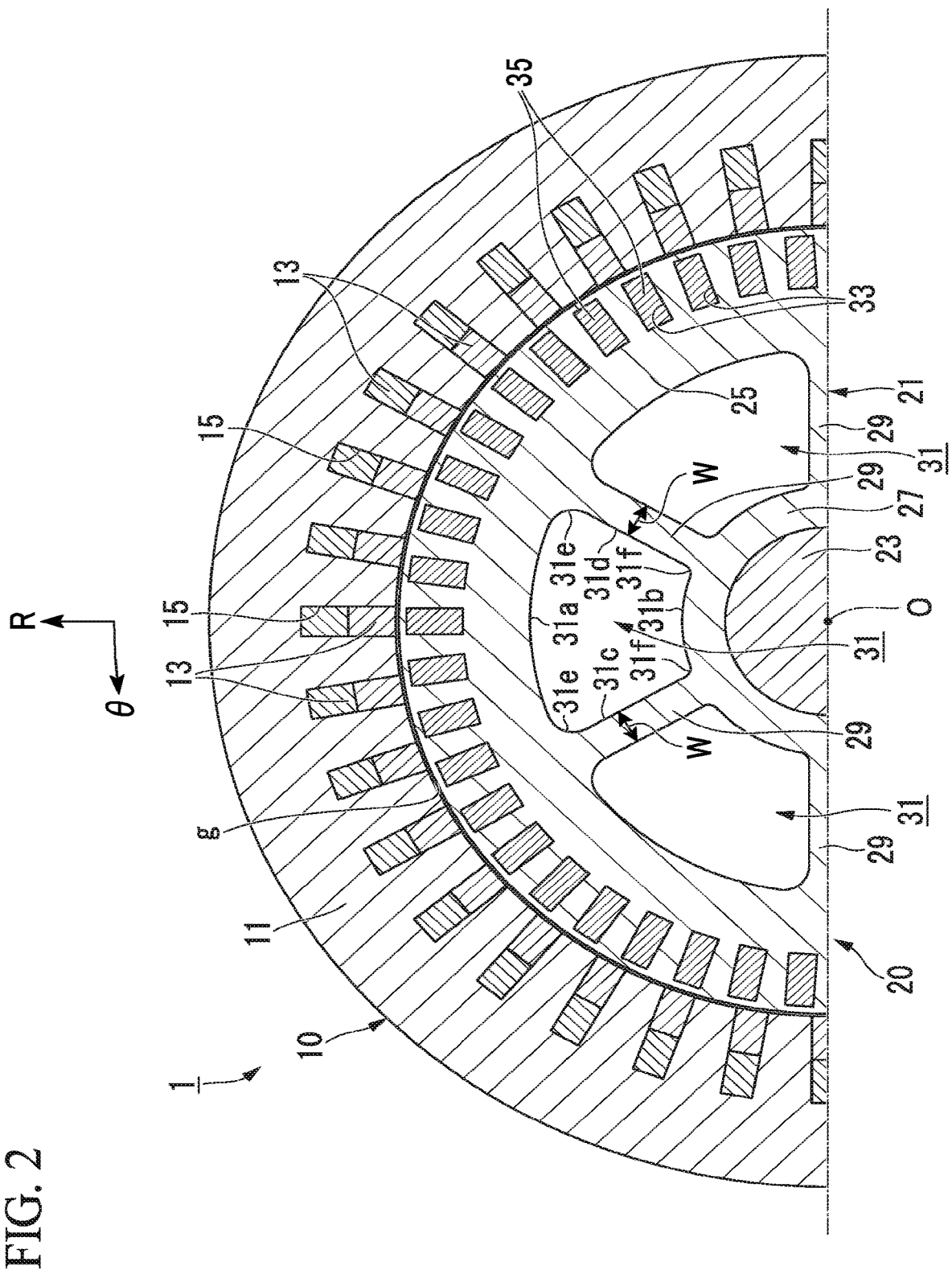
FIG. 2 is a sectional view taken along line F2-F2 of the motor illustrated in FIG. 1.

FIG. 2 is a sectional view taken along line F2-F2 of the motor 1 illustrated in FIG. 1.

As illustrated in FIG. 2, the rotor core 21 of the present embodiment has a yoke 25, a support 27, and a plurality of spokes 29.

The yoke 25 is formed in an annular shape (a cylindrical shape) when viewed in the axial direction Z, and supports a plurality of rotor bars (conductors) 35. To be more specific, a plurality of rotor slots 33 that extend in the axial direction Z are formed at an outer circumferential portion of the yoke 25. The plurality of rotor slots 33 are provided at the same position in the radial direction R, and are arranged at regular intervals in the circumferential direction θ. Each of the rotor bars 35 is inserted into one of the rotor slots 33. The rotor slots are not limited to the fully closed slots as illustrated in the figure, and may be semi-closed slots. The rotor bars 35 are formed of a metal material such as aluminum or copper. Both ends of the rotor bars 35 in the axial direction Z jut from both end faces of the rotor core 21 in the axial direction Z. The ends of the plurality of rotor bars 35 jutting from the rotor core 21 are integrally connected by annular end rings (not shown).

The support 27 is disposed inside the yoke 25 in the radial direction R, and supports the yoke 25. To be more specific, the support 27 is formed in a cylindrical shape, and is disposed with its axis coinciding with the central axis O. The aforementioned shaft 23 is disposed inside the support 27. The shaft 23 is fixed to the support 27 by press-fitting or shrink-fitting.

The plurality of spokes 29 are provided between the yoke 25 and the shaft 23, and support the yoke 25 with respect to the shaft 23. "Provided between the yoke and the shaft" mentioned herein is not limited to the case where the spokes 29 are directly connected to the shaft 23, and includes the case where an another element (e.g., the support 27 in the present embodiment) is present between the spokes 29 and the shaft 23, or the like. For example, in the present embodiment, the plurality of spokes 29 are provided between the yoke 25 and the support 27, and connect the yoke 25 and the support 27. "Support the yoke with respect to the shaft" mentioned herein is not limited to the case where the spokes 29 are directly connected to the shaft 23 and support the yoke 25, and includes the case where the spokes 29 are connected to an another element (e.g., the support 27 in the present embodiment) mounted on the shaft 23, and thereby the yoke 25 is supported with respect to the shaft 23, or the like.

"Spokes" mentioned herein refer to linear parts provided between the yoke 25 and the shaft 23, and are not limited to the elements that extend in a radial direction (the radial direction R of the yoke 25) centered on the central axis O, but may refer to elements that extend in a direction that intersects the radial direction. "Linear parts" are not limited to elements that extend linearly, but may also refer to elements that extend curvilinearly, curved elements, or elements whose widths gradually vary.

In the present embodiment, each of the spokes 29 extends linearly in the radial direction (the radial direction R of the yoke 25) centered on the central axis O. Each of the spokes 29 is, for example, a spoke-like rib that is provided integrally with the yoke 25 and the support 27. The plurality of spokes 29 are disposed apart from one another in the circumferential direction θ. The spokes 29 extend in the radial direction R with a constant width W when viewed in the axial direction Z, and are smoothly connected to an inner circumferential surface of the yoke 25 and an outer circumferential surface of the support 27 at opposite ends thereof in the radial direction R. The plurality of spokes 29 (the six spokes in the present embodiment) are disposed at regular intervals in the circumferential direction θ.

The number of spokes 29 is set to, for example, a number that is an integer multiple of the number of poles of the motor 1. "Integer multiples" include multiples by 1. For example, in the present embodiment, the number of spokes 29 is set to the same number as the number of poles of the motor 1. However, the number of spokes 29 may be a number that is different from the integer multiple of the number of poles of the motor 1. The case where the number of spokes 29 is different from the integer multiple of the number of poles of the motor 1 will be described below.

Next, gaps 31 between the neighboring spokes 29 will be described in detail.

In the present embodiment, the gaps (the spaces) 31 are formed, for example, in substantially the same shape. In the present embodiment, when viewed in the axial direction Z, cross-sectional shapes of the gaps 31 are substantially trapezoidal shapes. "Substantially trapezoidal shapes" mentioned herein include trapezoidal shapes in which sides are curved and trapezoidal shapes in which corners are rounded.

In the present embodiment, when viewed in the axial direction Z, the cross-sectional shapes of the gaps 31 are formed to be surrounded by arcuate portions 31a and 31b, straight portions 31c and 31d, and corner rounded portions 31c, 31c, 31f and 31f. The arcuate portions 31a are an inner circumferential edge of the yoke 25, and are formed, for example, in circular arc shapes centered on the central axis O. The arcuate portions 31b are an outer circumferential edge of the support 27, and are formed, for example, in a circular arc shape centered on the central axis O. The arcuate portions 31h are provided inside the arcuate portions 31a in the radial direction R at the same position in the circumferential direction θ. The straight portions 31c and 31d extend in linear shapes to connect ends of the arcuate portions 31a and 31b.

The corner rounded portions 31e are provided at corners where the arcuate portions 31a are connected to the straight portions 31c and 31d. The corner rounded portions 31e are formed, for example, in circular arc shapes, and are smoothly connected to the arcuate portion 31a and the straight portions 31c and 31d. The corner rounded portions 31e may be called "circular arc portions." On the other hand, the other corner rounded portions 31f are provided at corners where the arcuate portions 31b are connected to the straight portions 31c and 31d. The corner rounded portions 31f are formed, for example, in circular arc shapes, and are smoothly connected to the arcuate portions 31b and the straight portions 31c and 31d. Thereby, stress concentration at the corners is inhibited.

Figure 3:
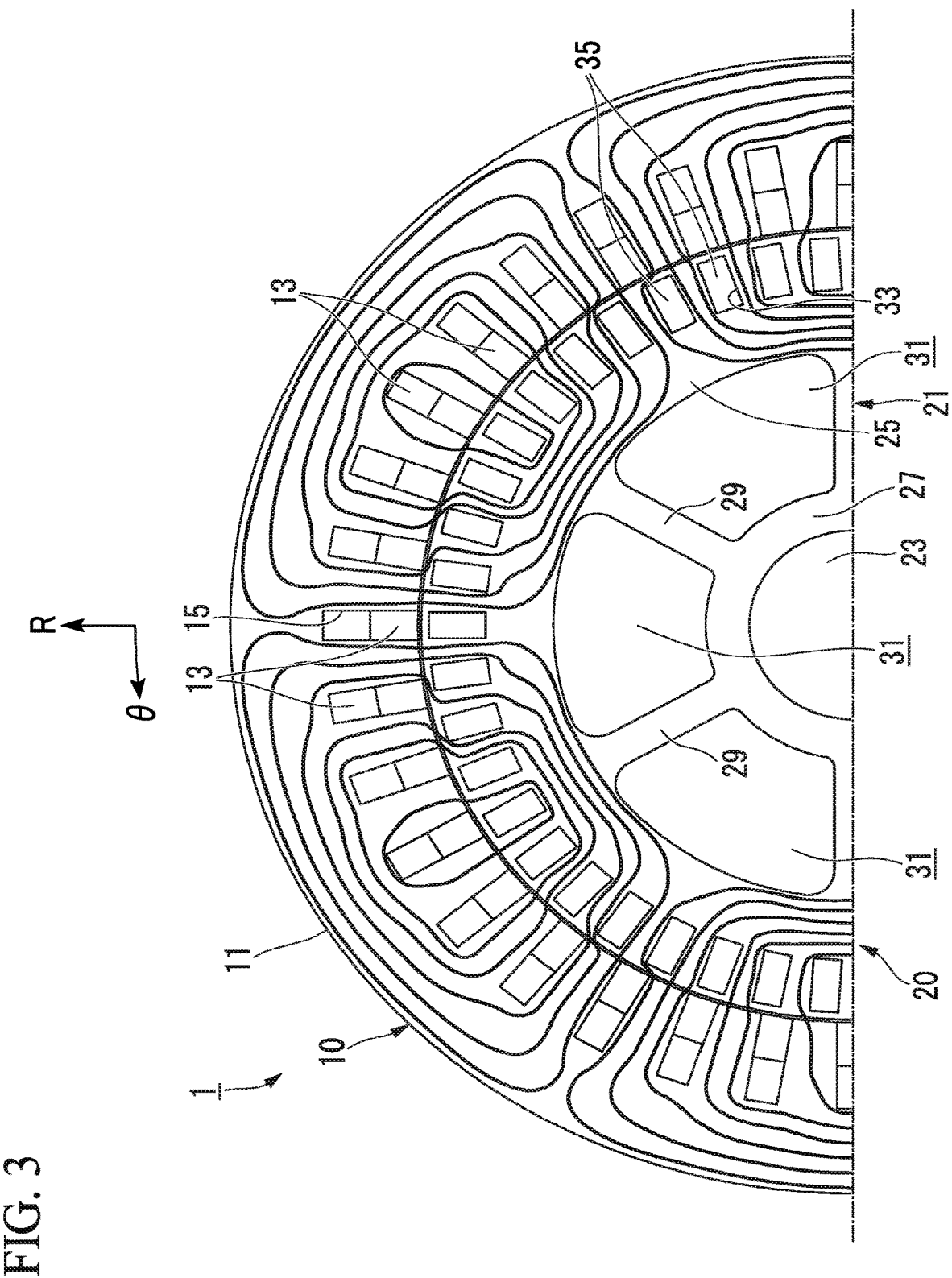
FIG. 3 is a sectional view illustrating an example of magnetic flux lines of the motor of the first embodiment.

FIG. 3 is a sectional view illustrating an example of lines of magnetic flux of the motor 1 of the present embodiment.

As illustrated in FIG. 3, magnetic flux generated when the stator coils 13 are energized forms closed loops around the stator coils 13. To be specific, the magnetic flux passes between the neighboring stator coils 13 adjacent in the circumferential direction θ and between the neighboring rotor bars 35 adjacent in the circumferential direction θ, and then passes between the gaps 31 and the rotor bars 35 in the yoke 25. In other words, the magnetic flux passes outside the spokes 29 in the radial direction R. The magnetic flux passing between the gaps 31 and the rotor bars 35 passes between the neighboring rotor bars 35 adjacent in the circumferential direction θ and between the neighboring stator coils 13 adjacent in the circumferential direction θ, and then flows outside the stator coils 13 in the radial direction R in the stator core 11. The closed loop of the magnetic flux is formed in this way. The magnetic flux around the stator coils 13 is rotated in the circumferential direction θ, and thereby the rotor 20 is also rotated.

According to the motor 1 having this constitution, a reduction in weight can be achieved. That is, the rotor core 21 of the present embodiment has the plurality of spokes 29 that are provided between the annular yoke 25 and the shaft 23 and support the yoke 25. According to this constitution, the relatively large gaps 31 can be provided between the neighboring spokes 29. Thereby, a reduction in weight of the motor 1 can be achieved. In the case where magnetic flux passes outside the spokes 29 in the radial direction R, a reduction in a magnetic property of the motor 1 can be inhibited even in the case where the spokes 29 are provided.

In the present embodiment, the spokes 29 are formed in linear shapes. According to this constitution, the gaps 31 between the spokes 29 are easily increased while mechanical strength of the motor 1 is secured. For this reason, it is easy to further achieve the reduction in weight of the motor 1.

Here, a path along which the magnetic flux flows in the rotor 20 is subjected to a change in relative position inside the rotor 20 by a slip frequency. For this reason, when the number of spokes 29 is a number that is not divisible by the number of poles of the motor 1, portions where the magnetic flux flows to the vicinity of the shaft 23 through the spokes 29 and portions where the path of the magnetic flux is formed only outside the spokes 29 in the radial direction R may occur due to presence or absence of the spokes 29. For this reason, the magnetic flux that flows between the rotor 20 and the stator 10 is biased, and torque pulsation or the like of the rotor 20 against the stator 10 may occur.

However, in the present embodiment, six spokes 29 equal in number to the poles of the motor 1 are formed. Thereby, regardless of positions of the spokes 29, a force acting on the rotor 20 from the stator 10 can be equalized. Thereby, torque pulsation or the like can sometimes be inhibited from occurring at the rotor 20. This is also true of the case where the number of spokes 29 is an integer multiple of the number of poles of the motor 1.

For example, in the present embodiment, some of the cooling air from the blower 60 into the housing 5 (or the cooling air sent from the fan mounted on the shaft 23) may flow into the gaps 31. Thereby, the motor 1 that is also excellent in the aspect of cooling efficiency can be provided. The gaps 31 are, for example, holes intended to reduce weight, and the cooling air may not flow thereinto.

Next, several modifications of the first embodiment will be described. As in the first embodiment, a reduction in weight of the motor 1 can also be achieved by constitutions of the modifications.

(First Modification)

Figure 4:
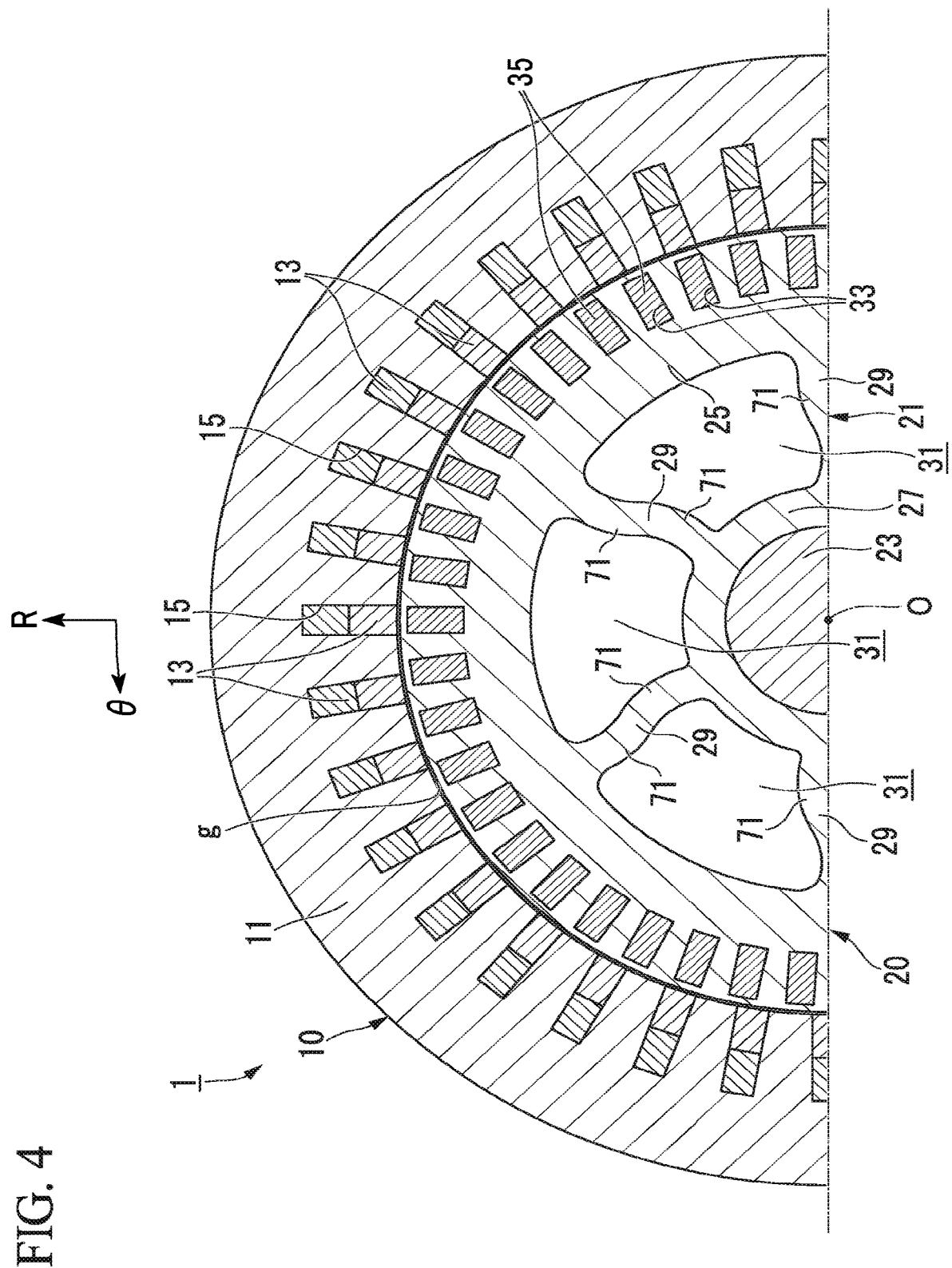
FIG. 4 is a sectional view illustrating a motor of a first modification of the first embodiment.

FIG. 4 is a sectional view illustrating a motor 1 of a first modification.

As illustrated in FIG. 4, each spoke 29 in the motor 1 of the first modification is formed in a waveform having at least one bend 71 (e.g., a plurality of bends 71). Each of the spokes 29 is curved at the bend 71 in the circumferential direction θ.

(Second Modification)

Figure 5:
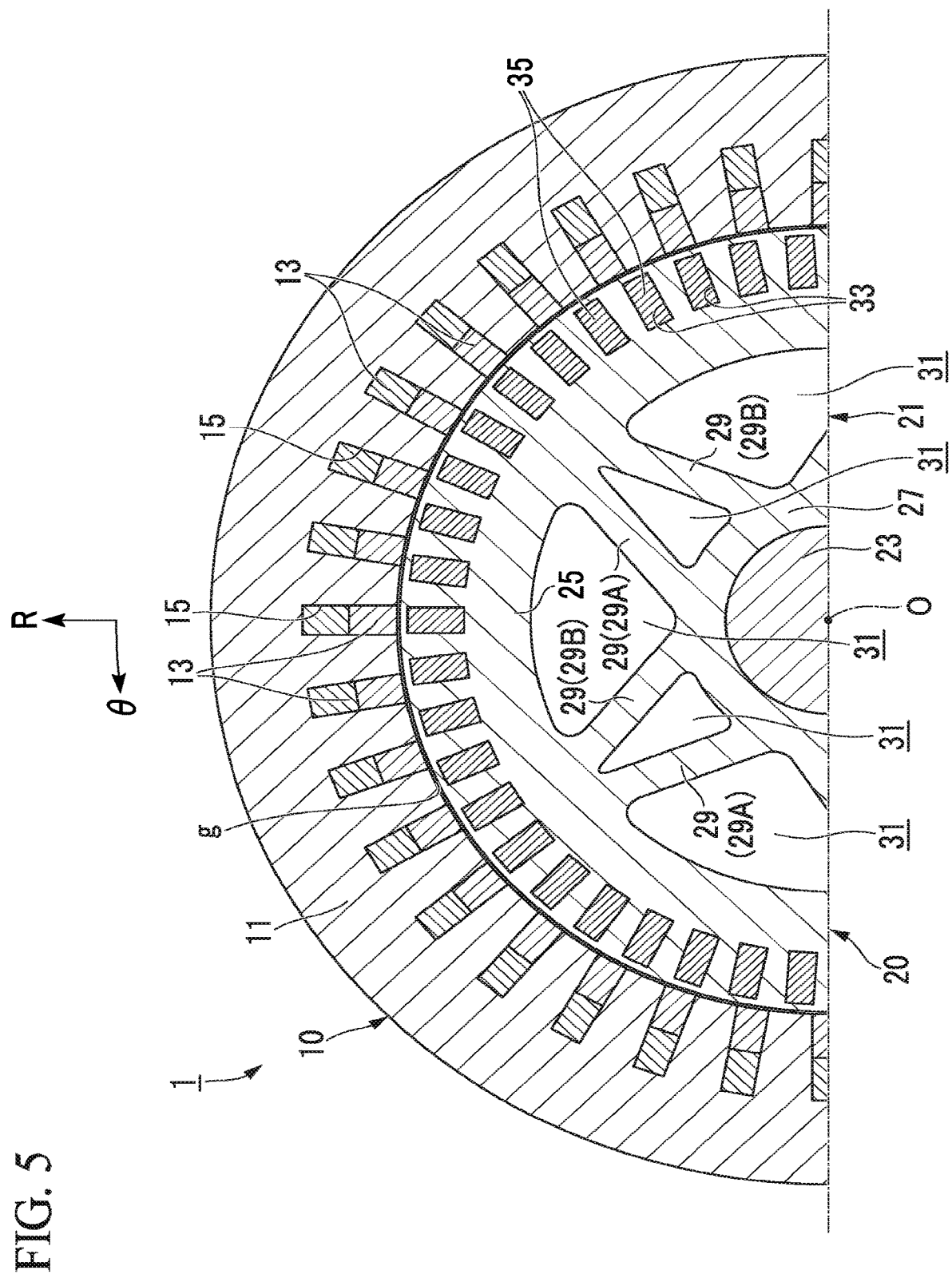
FIG. 5 is a sectional view illustrating a motor of a second modification of the first embodiment.

FIG. 5 is a sectional view illustrating a motor 1 of a second modification.

As illustrated in FIG. 5, in the motor 1 of the second modification, a cross-sectional shape of each gap 31 when viewed in the axial direction Z is formed in a substantially triangular shape. That is, in the present modification, at least some spokes 29 included in the plurality of spokes 29 are arranged such that the gap 31 between neighboring spokes 29 has a substantially triangular shape. "Substantially triangular shape" mentioned herein includes a triangular shape in which sides are curved and a triangular shape in which corners are rounded.

From another viewpoint, the plurality of spokes 29 of the present modification extend in directions that intersect a radial direction (the radial direction R of a yoke 25) centered on the central axis O. The plurality of spokes 29 of the present modification include first oblique spokes 29A that are inclined to a first side in the circumferential direction θ with respect to the radial direction centered on the central axis O, and second oblique spokes 29B that are inclined to a second side that is a side opposite to the first side in the circumferential direction θ. The first oblique spokes 29A and the second oblique spokes 29B are arranged, for example, to alternate with each other in the circumferential direction θ.

According to this constitution, since the gaps 31 are surrounded by the plurality of spokes 29 that extend in different directions, the mechanical strength of the motor 1 can sometimes be enhanced. For this reason, for example, the motor 1 that is excellent in the aspect of vibration (noise) and lifespan of the motor 1 can be provided.

Second Embodiment

Next, a second embodiment will be described with reference to FIG. 6.

The present embodiment is different from the first embodiment in that the number of spokes 29 is set to a number that is different from an integer multiple of the number of poles of the motor 1. Constitutions other than that to be described below are the same as in the first embodiment.

Figure 6:
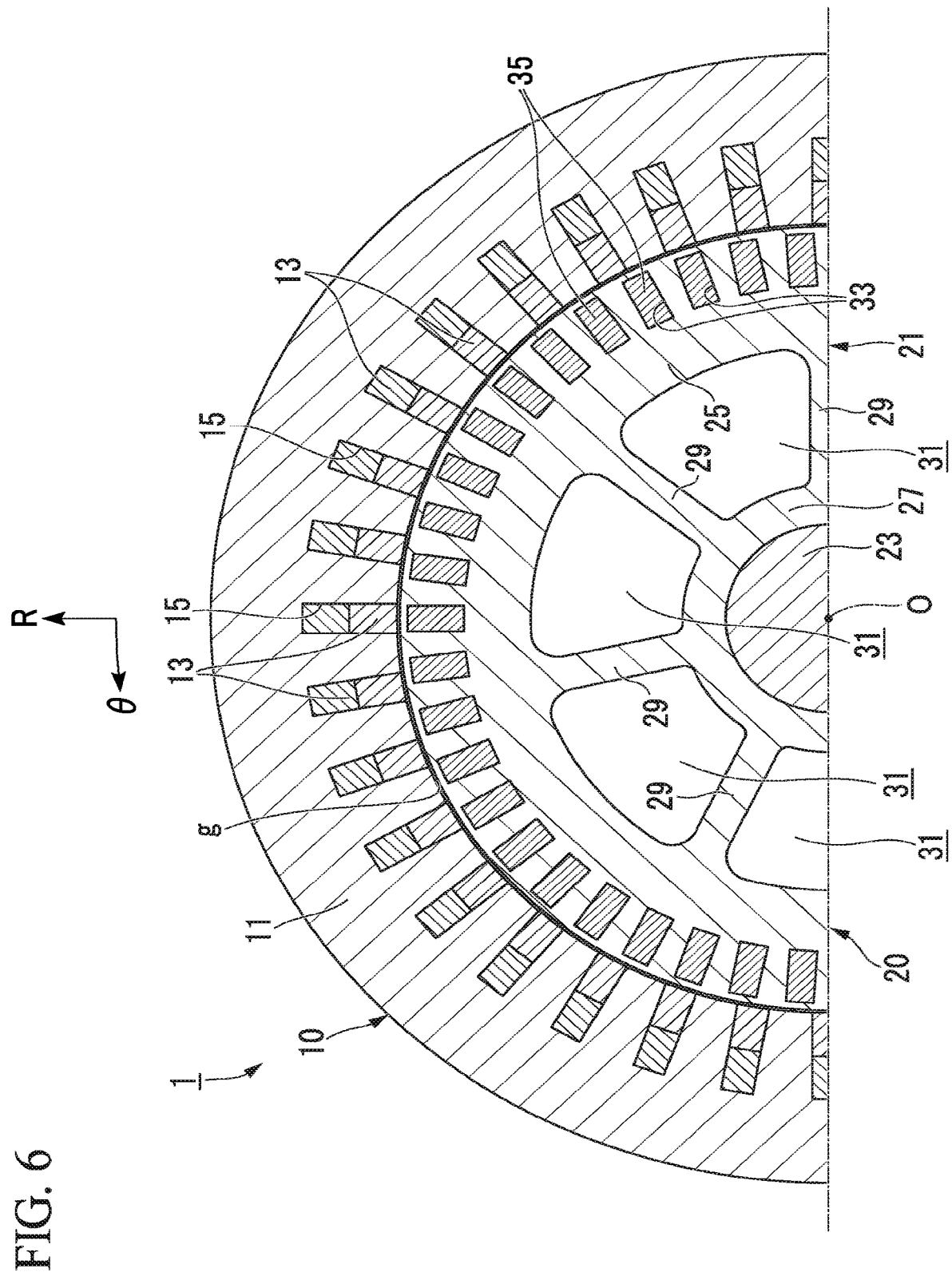
FIG. 6 is a sectional view illustrating a motor of a second embodiment.

FIG. 6 is a sectional view illustrating a motor 1 of a second embodiment.

As illustrated in FIG. 6, in the present embodiment, the number of spokes 29 is set to a number that is different from an integer multiple of the number of poles of the motor 1. That is, the number of spokes 29 is set to a number that is not divisible by the number of poles of the motor 1. For example, in the present embodiment, the motor 1 has six poles, and the number of spokes 29 is seven. However, the constitution of the embodiment is not limited to the above example.

Here, when the number of spokes 29 is set to a number that is divisible by the number of poles of the motor 1, a magnitude of magnetic flux that flows between a rotor 20 and a stator 10 is changed over time, which is sometimes the cause of torque pulsation. However, in the present embodiment, the number of spokes 29 is set to a number that is not divisible by the number of poles of the motor 1. According to this constitution, the torque pulsation generated by the motor 1 can sometimes be inhibited.

Third Embodiment

Next, a third embodiment will be described with reference to FIG. 7.

The present embodiment is different from the first embodiment in that spokes 29 are directly fixed to a shaft 23. Constitutions other than that to be described below are the same as in the first embodiment.

Figure 7:
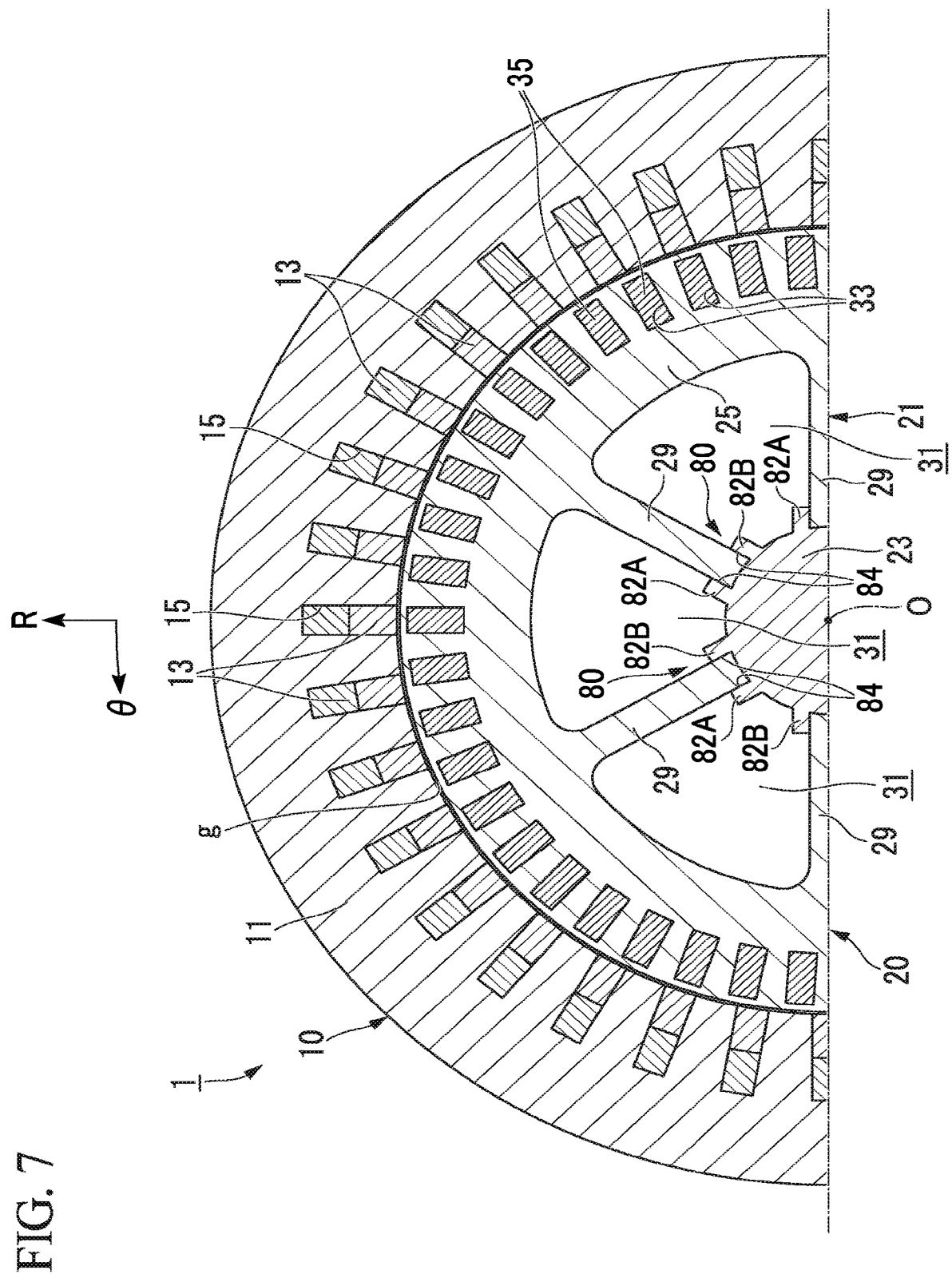
FIG. 7 is a sectional view illustrating a motor of a third embodiment.

FIG. 7 is a sectional view illustrating a motor 1 of a third embodiment.

As illustrated in FIG. 7, a rotor core 21 of the present embodiment does not have a support 27, and the spokes 29 are directly fixed to the shaft 23. To be specific, a plurality of fixtures 80 that fix the respective spokes 29 to the shaft 23 are provided on the shaft 23. In the present embodiment, each of the fixtures 80 has a pair of protrusions (key structures) 82A and 82B that are provided on the shaft 23. In the present embodiment, the pair of protrusions 82A and 82B are provided integrally with the shaft 23, and protrude outward from the shaft 23 in the radial direction R. Each of the pair of protrusions 82A and 82B extends in the axial direction Z. Each of the spokes 29 is inserted between the pair of protrusions 82A and 82B, and is sandwiched from both sides by the pair of protrusions 82A and 82B. Thereby, the spokes 29 are fixed to the shaft 23. "Fix" mentioned herein refers to a connection relationship in which the shaft 23 is rotated in association with rotation of the rotor core 21, and also includes the case where there is slight play between the spoke 29 and the fixture 80, or the like.

Each of the pair of protrusions 82A and 82B has support surfaces 84 that support the spoke 29 in the circumferential direction θ. For example, the spoke 29 comes into contact with the support surfaces 84 when the rotor core 21 is rotated, and thereby the support surfaces 84 receive a force in the rotational direction (the circumferential direction θ) of the rotor core 21. Thereby, in the case where the rotor core 21 is rotated, the shaft 23 is rotated in association with the rotation of the rotor core 21.

For example, in the structure of the first embodiment, when the gaps 31 between the spokes 29 are formed to be relatively large, a thickness of the support 27 in the radial direction R may be thinned. When the thickness of the support 27 in the radial direction R is thinned, even if the support 27 is mounted on the shaft 23 by press-fitting or shrinkage fitting, the fixing of the rotor core 21 to the shaft 23 may become loose. When the fixing of the rotor core 21 to the shaft 23 becomes loose, slippage occurs between the shaft 23 and the rotor core 21, and efficiency of the motor 1 may be reduced.

Thus, in the present embodiment, the plurality of fixtures 80 for fixing the spokes 29 to the shaft 23 are provided, and each of the fixtures 80 has the support surfaces 84 that support each of the spokes 29 in the circumferential direction θ. Thereby, the shaft 23 is reliably rotated in association with the rotation of the rotor core 21. For this reason, the gaps 31 can be formed to be large without being restricted to the thickness of the support 27 or the like. When the gaps 31 can be formed to be large, the reduction in weight of the motor 1 can be further achieved. According to the constitution of the present embodiment, the support 27 can be omitted. From this viewpoint, the reduction in weight of the motor 1 can be further achieved.

Next, several modifications of the third embodiment will be described.

(First Modification)

Figure 8:
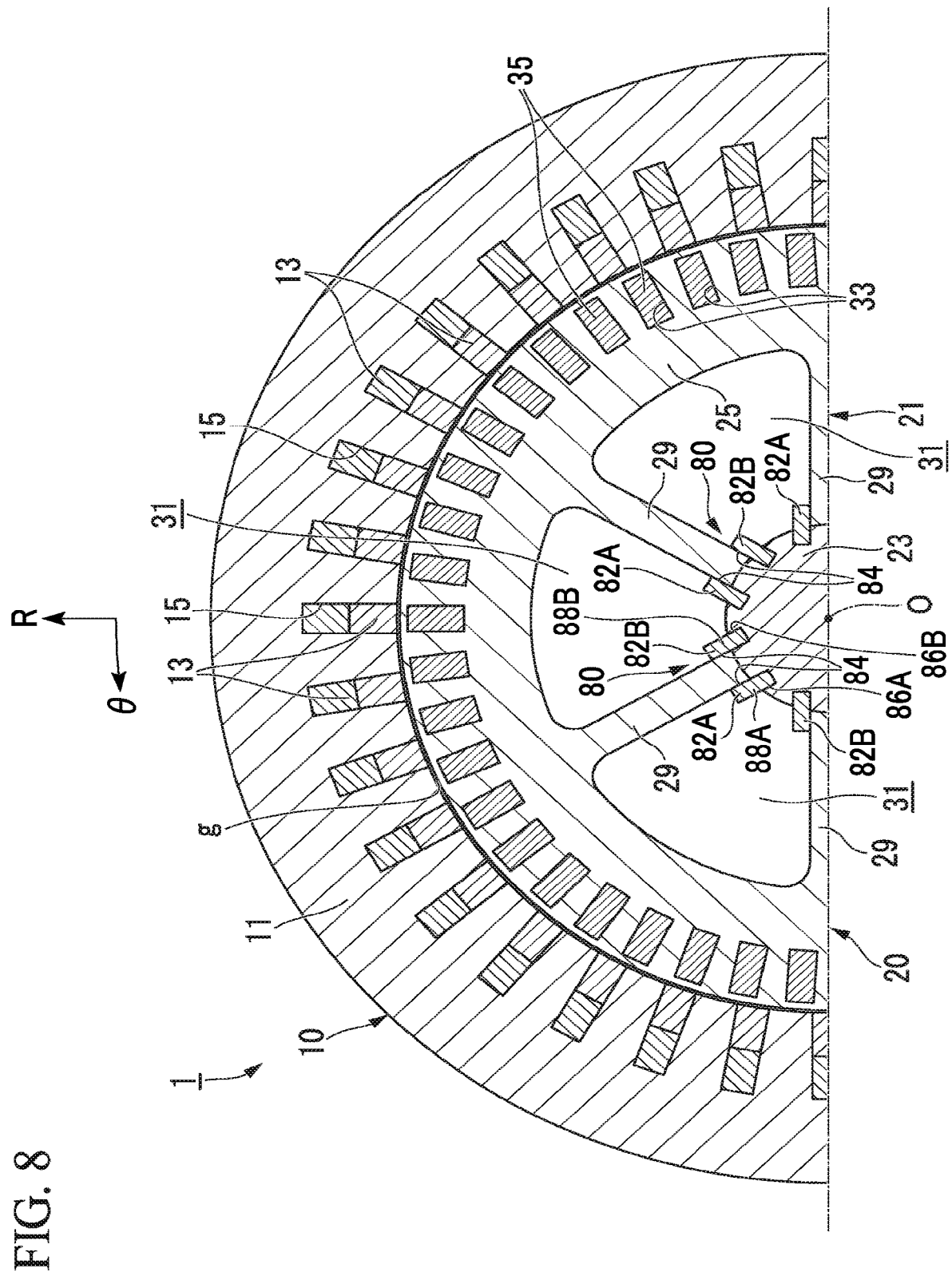
FIG. 8 is a sectional view illustrating a motor of a first modification of the third embodiment.

FIG. 8 is a sectional view illustrating a motor 1 of a first modification.

As illustrated in FIG. 8, each fixture 80 of the present modification has grooves (key grooves) 86A and 86B that are provided in a shaft 23, and engaging members (keys) 88A and 88B that are inserted into the grooves 86A and 86B. In a state in which the engaging members 88A and 88B are inserted into the grooves 86A and 86B, the engaging members 88A and 88B form a pair of protrusions 82A and 82B that protrude outward from a surface of the shaft 23 in the radial direction R. The grooves 86A and 86B and the engaging members 88A and 88B extend in the axial direction Z. Each of the spokes 29 is inserted between the pair of protrusions 82A and 82B, and is sandwiched from both sides by the pair of protrusions 82A and 82B. Thereby, the spokes 29 are fixed to the shaft 23.

(Second Modification)

Figure 9:
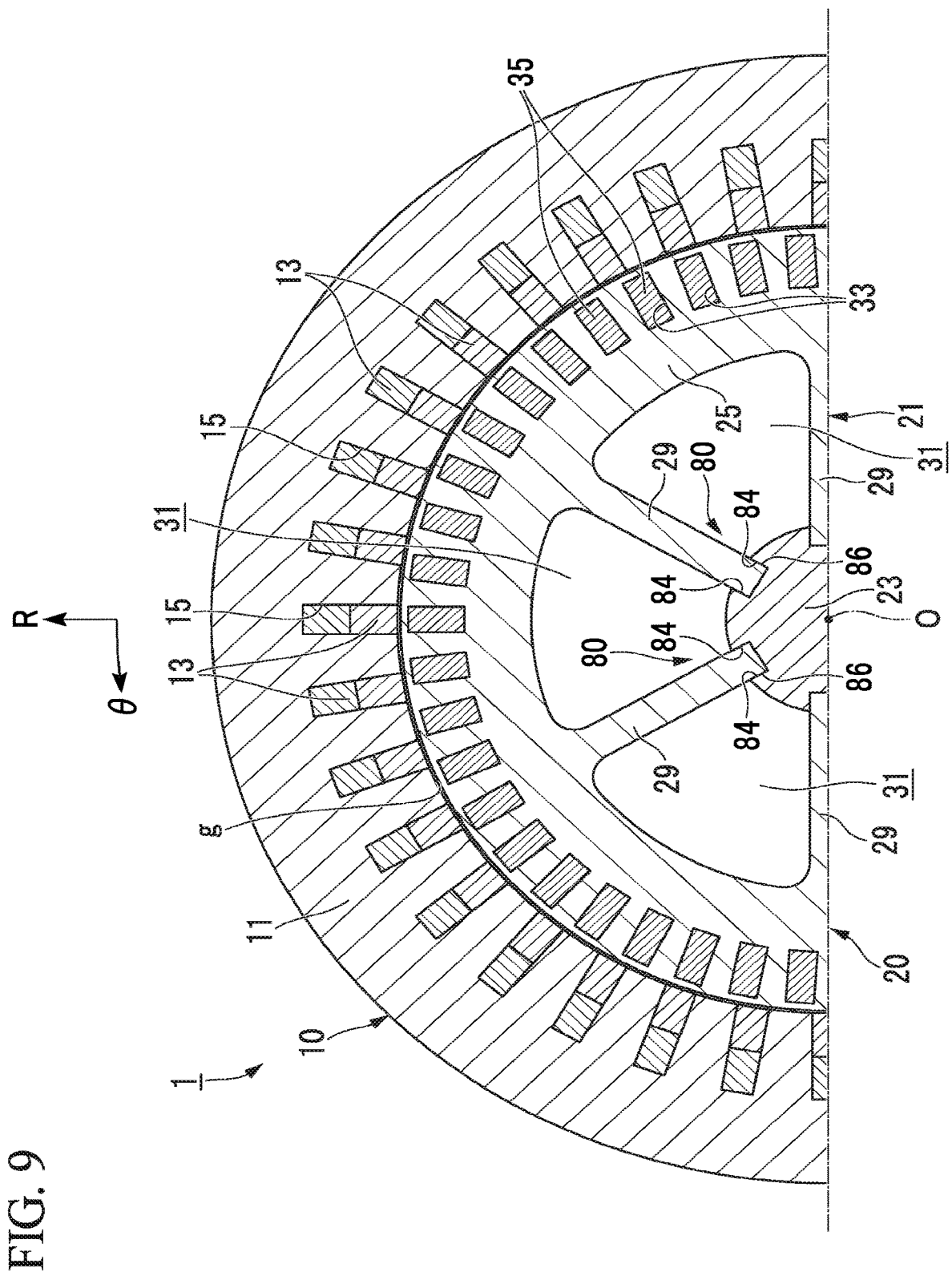
FIG. 9 is a sectional view illustrating a motor of a second modification of the third embodiment.

FIG. 9 is a sectional view illustrating a motor 1 of a second modification.

As illustrated in FIG. 9, each fixture 80 of the present modification is a groove 86 provided in a shaft 23. The grooves 86 are recessed inward from a surface of the shaft 23 in the radial direction R. The grooves 86 extend in the axial direction Z. The grooves 86 are provided at positions corresponding to the spokes 29 in the circumferential direction θ. Ends of the spokes 29 are inserted into the grooves 86. Thereby, the spokes 29 are fixed to the shaft 23. Each of the grooves 86 has support surfaces 84 that support each of the spokes 29 in the circumferential direction θ. For example, the spokes 29 come into contact with the support surfaces 84 when a rotor core 21 is rotated relative to a stator core 11, and the support surfaces 84 receive a force in the rotational direction (the circumferential direction θ) of the rotor core 21. Thereby, the shaft 23 is rotated in association with the rotation of the rotor core 21.

As in the third embodiment, the shaft 23 can be reliably rotated in association with the rotation of the rotor core 21 by the constitutions of the first and second modifications. For this reason, the gaps 31 can be formed to be large, and a reduction in weight of the motor 1 can be further achieved.

Fourth Embodiment

Next, a fourth embodiment will be described with reference to FIG. 10.

The present embodiment is different from the first embodiment in that a plurality of spokes 29 are arranged at positions that at least partly deviate from each other in the circumferential direction θ. Constitutions other than that to be described below are the same as in the first embodiment.

Figure 10:
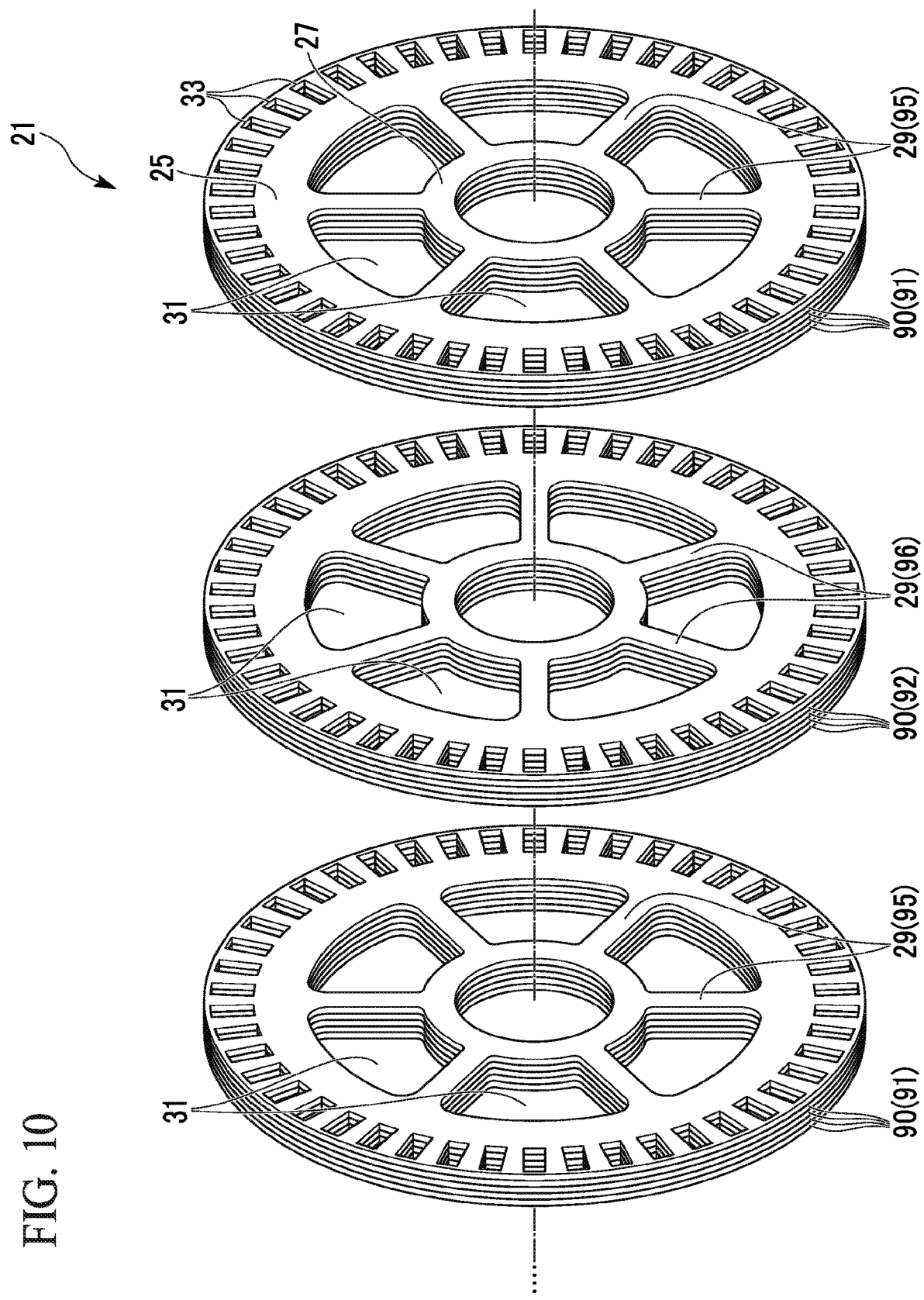
FIG. 10 is a partly exploded perspective view illustrating a rotor core of a fourth embodiment.

FIG. 10 is a partly exploded perspective view illustrating a rotor core 21 of a fourth embodiment.

As illustrated in FIG. 10, the rotor core 21 of the present embodiment has a plurality of members 90 that overlap one another in the axial direction Z. Each of the plurality of members 90 forms a part of a yoke 25. The members 90 are, for example, magnetic steel sheets that are stacked in the axial direction Z to form the rotor core 21. In the present embodiment, the plurality of members 90 include a plurality of first members 91 and a plurality of second members 92. The first members 91 and the second members 92 are nearly identical to each other, for example, except that arrangement positions of the spokes 29 in the circumferential direction θ are different. In the present embodiment, the plurality of first members 91 are continuously stacked in the axial direction Z, and thereby a set of first members 91 is formed. Likewise, the plurality of second members 92 are continuously stacked in the axial direction Z, and thereby a set of second members 92 is formed. The set of first members 91 and the set of second members 92 are alternately stacked in the axial direction Z. The set of first members 91 and the set of second members 92 are mutually connected by caulking or welding. The first members 91 and the second members 92 may be alternately arranged one by one.

In the present embodiment, the plurality of spokes 29 have a plurality of first spokes 95 that are formed by the first members 91, and a plurality of second spokes 96 that are formed by the second members 92. At least a part of each of the first spokes 95 and at least a part of each of the second spokes 96 are arranged at mutually different positions in the circumferential direction θ.

Figure 11:
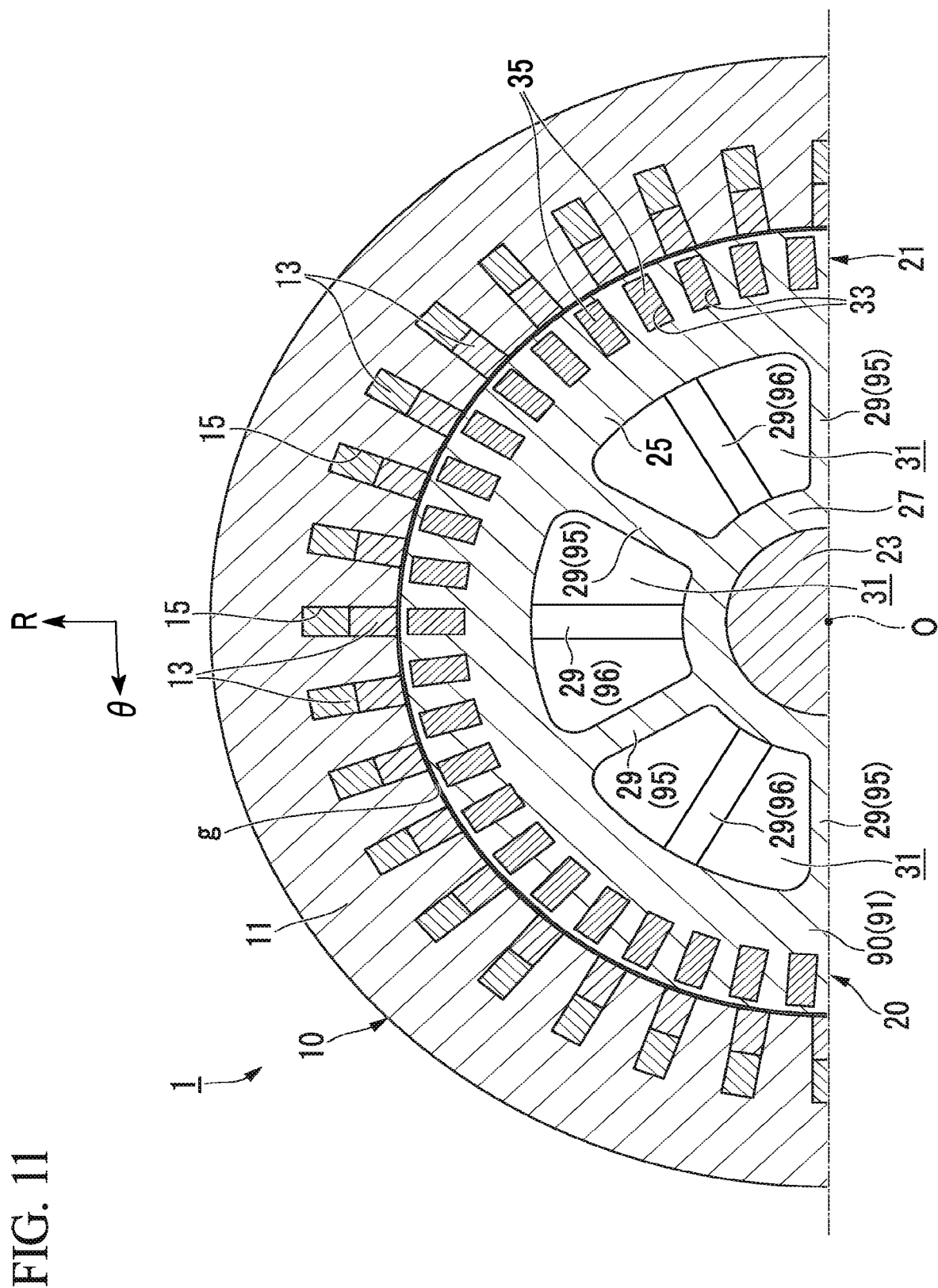
FIG. 11 is a sectional view illustrating a motor of the fourth embodiment.

FIG. 11 is a sectional view illustrating the motor 1 of the present embodiment.

As illustrated in FIG. 11, in the present embodiment, each of the first spokes 95 is arranged at a position in the circumferential direction θ corresponding to a position between the neighboring second spokes 96. In other words, when viewed in the axial direction Z, the first spokes 95 are arranged at positions that overlap gaps 31 between the neighboring second spokes 96. Likewise, each of the second spokes 96 is arranged at a position in the circumferential direction θ corresponding to a position between the neighboring first spokes 95. In other words, when viewed in the axial direction Z, the second spokes 96 are arranged at positions that overlap the gaps 31 between the neighboring first spokes 95.

According to this constitution, perimeters of the gaps 31 between the first spokes 95 are reinforced by the second spokes 96. Likewise, perimeters of the gaps 31 between the second spokes 96 are reinforced by the first spokes 95. Thereby, the mechanical strength of the motor 1 can be enhanced. From another viewpoint, when the mechanical strength of the motor 1 can be enhanced by the first and second spokes 95 and 96 arranged at positions that are at least partly different from each other in the circumferential direction θ, widths W of the first and second spokes 95 and 96 can be reduced. Thereby, a reduction in weight of the motor 1 can be further achieved.

The plurality of spokes 29 of the rotor core 21 may have three or more kinds of spokes 29 arranged at positions that are at least partly different from one another in the circumferential direction θ.

Next, several modifications of the fourth embodiment will be described.

(First Modification)

Figure 12:
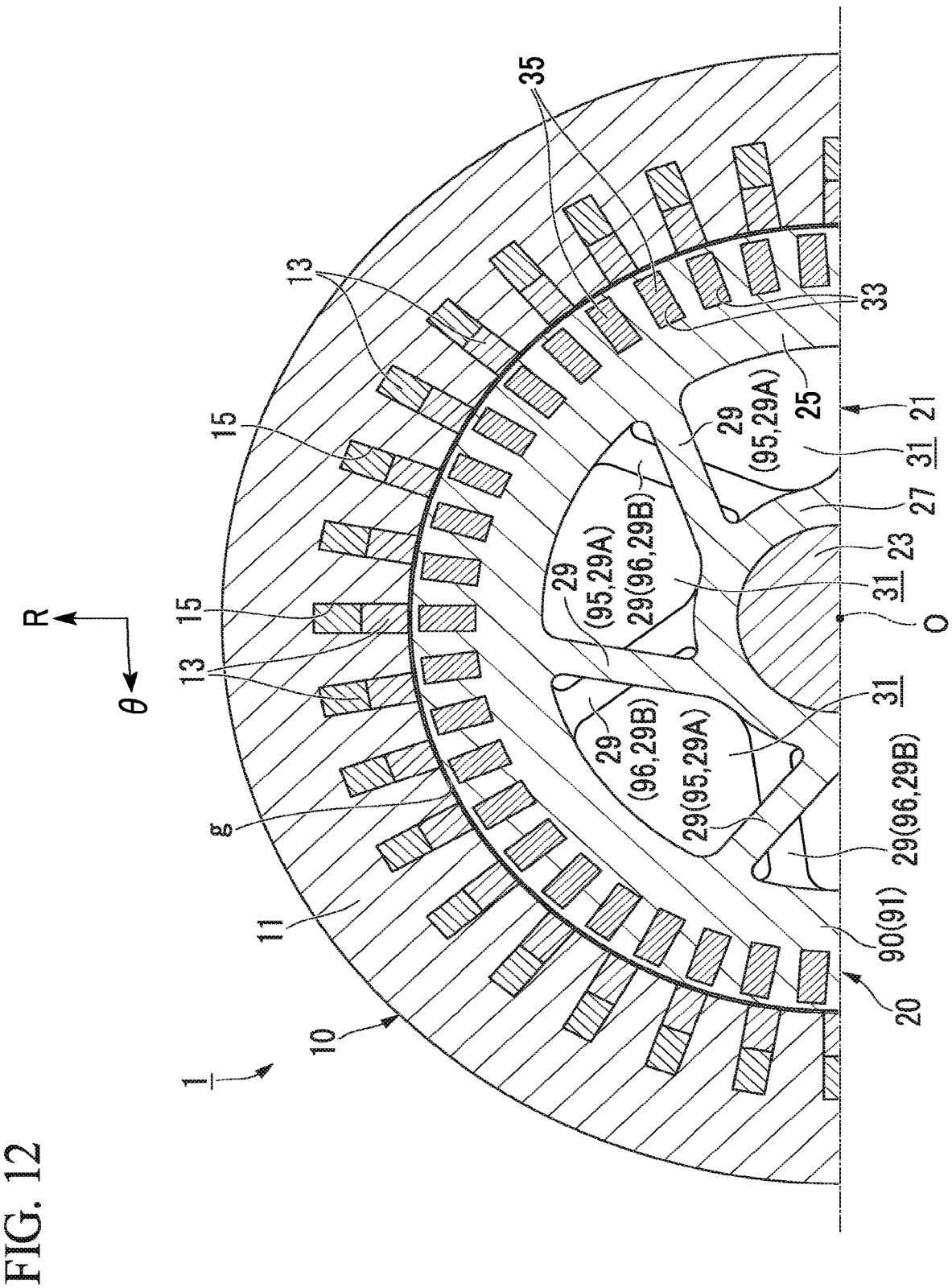
FIG. 12 is a sectional view illustrating a motor of a first modification of the fourth embodiment.

FIG. 12 is a sectional view illustrating a motor 1 of a first modification.

As illustrated in FIG. 12, in the present modification, first spokes 95 and second spokes 96 extend in directions that intersect a radial direction centered on the central axis O (the radial direction R of a yoke 25). For example, the first spokes 95 are first oblique spokes 29A that are inclined to a first side in the circumferential direction θ with respect to the radial direction centered on the central axis O. On the other hand, the second spokes 96 are second oblique spokes 29B that are inclined to a second side that is a side opposite to the first side in the circumferential direction θ. When viewed in the axial direction Z, the first spokes 95 and the second spokes 96 are arranged to intersect each other.

According to this constitution, rigidity in a plurality of directions is improved by the first spokes 95 and the second spokes 96, and mechanical strength of the motor 1 as a whole can be further enhanced.

(Second Modification)

Figure 13:
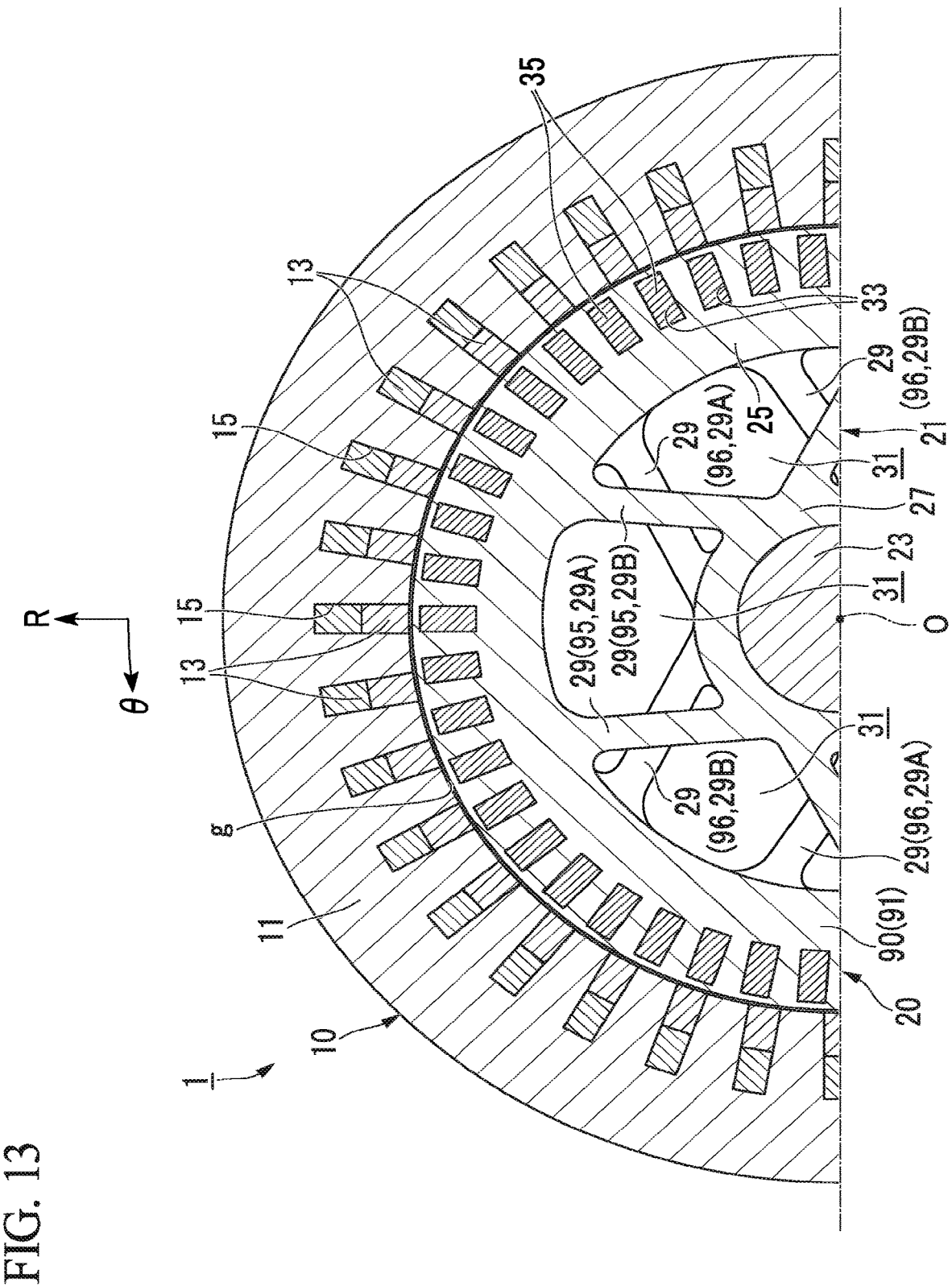
FIG. 13 is a sectional view illustrating a motor of a second modification of the fourth embodiment.

FIG. 13 is a sectional view illustrating a motor 1 of a second modification.

As illustrated in FIG. 13, in the present modification, first spokes 95 and second spokes 96 extend in directions that intersect a radial direction (the radial direction R of a yoke 25) centered on the central axis O. In the present modification, each of a first member 91 and a second member 92 includes a plurality of first oblique spokes 29A and a plurality of second oblique spokes 29B. That is, in the first members 91, the first oblique spokes 29A and the second oblique spokes 29B are alternately arranged in the circumferential direction θ. Likewise, in the second members 92, the first oblique spokes 29A and the second oblique spokes 29B are alternately arranged in the circumferential direction θ.

According to this constitution, as in the first modification, mechanical strength of the motor 1 as a whole can be further enhanced.

Fifth Embodiment

Next, a fifth embodiment will be described with reference to FIG. 14.

The present embodiment is different from the first embodiment in that a wind control structure 100 is provided on at least one of a rotor core 21 or a perimeter of the rotor core 21. Constitutions other than that to be described below are the same as in the first embodiment.

Figure 14:
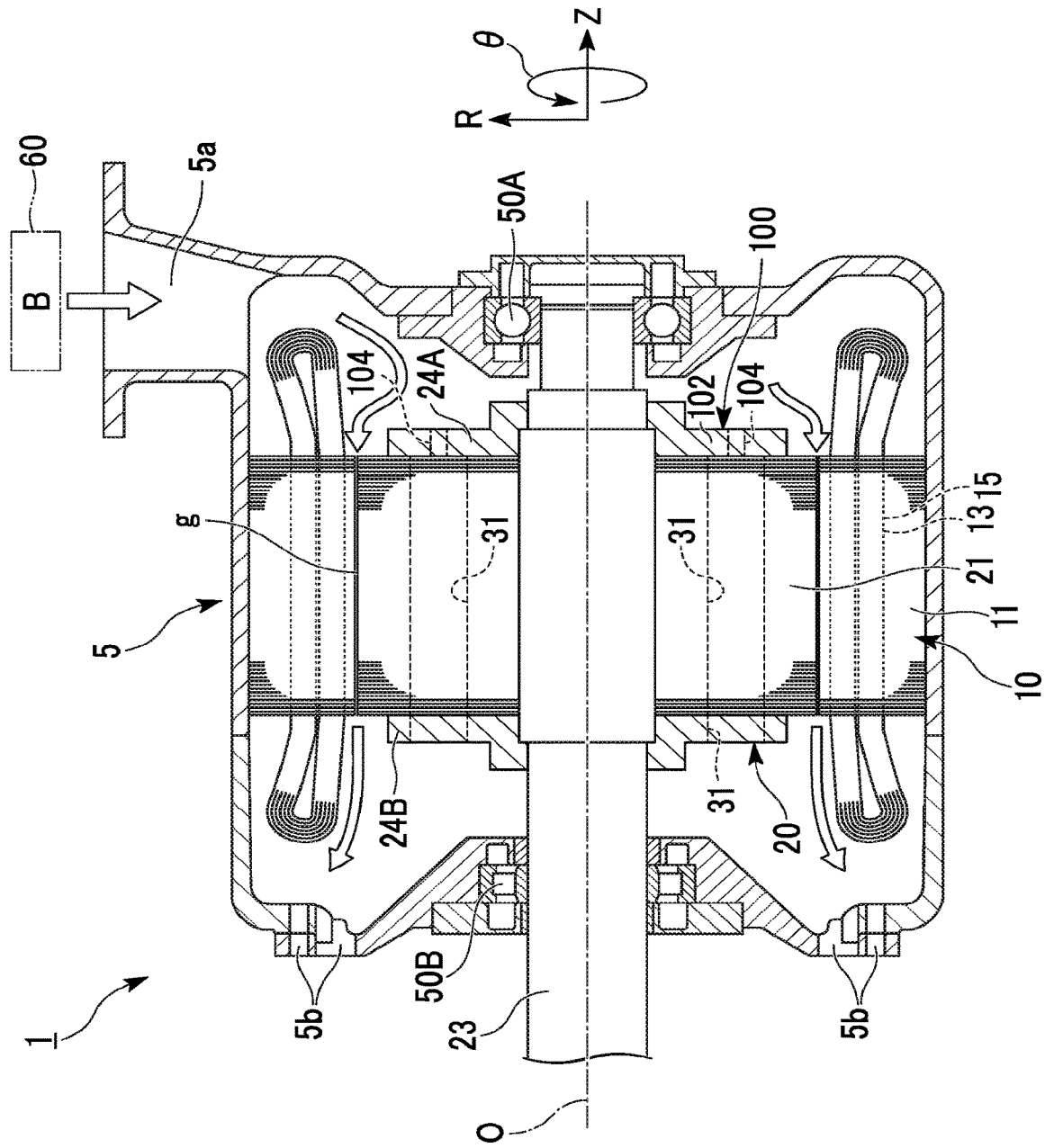
FIG. 14 is a sectional view illustrating a motor of a fifth embodiment.

FIG. 14 is a sectional view illustrating a motor 1 of the present embodiment.

As illustrated in FIG. 14, a first pressing plate 24A is located upstream from the rotor core 21 in a flow direction of wind in a housing 5 (a direction from a first vent hole 5a toward second vent holes 5b). On the other hand, a second pressing plate 24B is located downstream from the rotor core 21 in the flow direction of wind in the housing 5.

Figure 15:
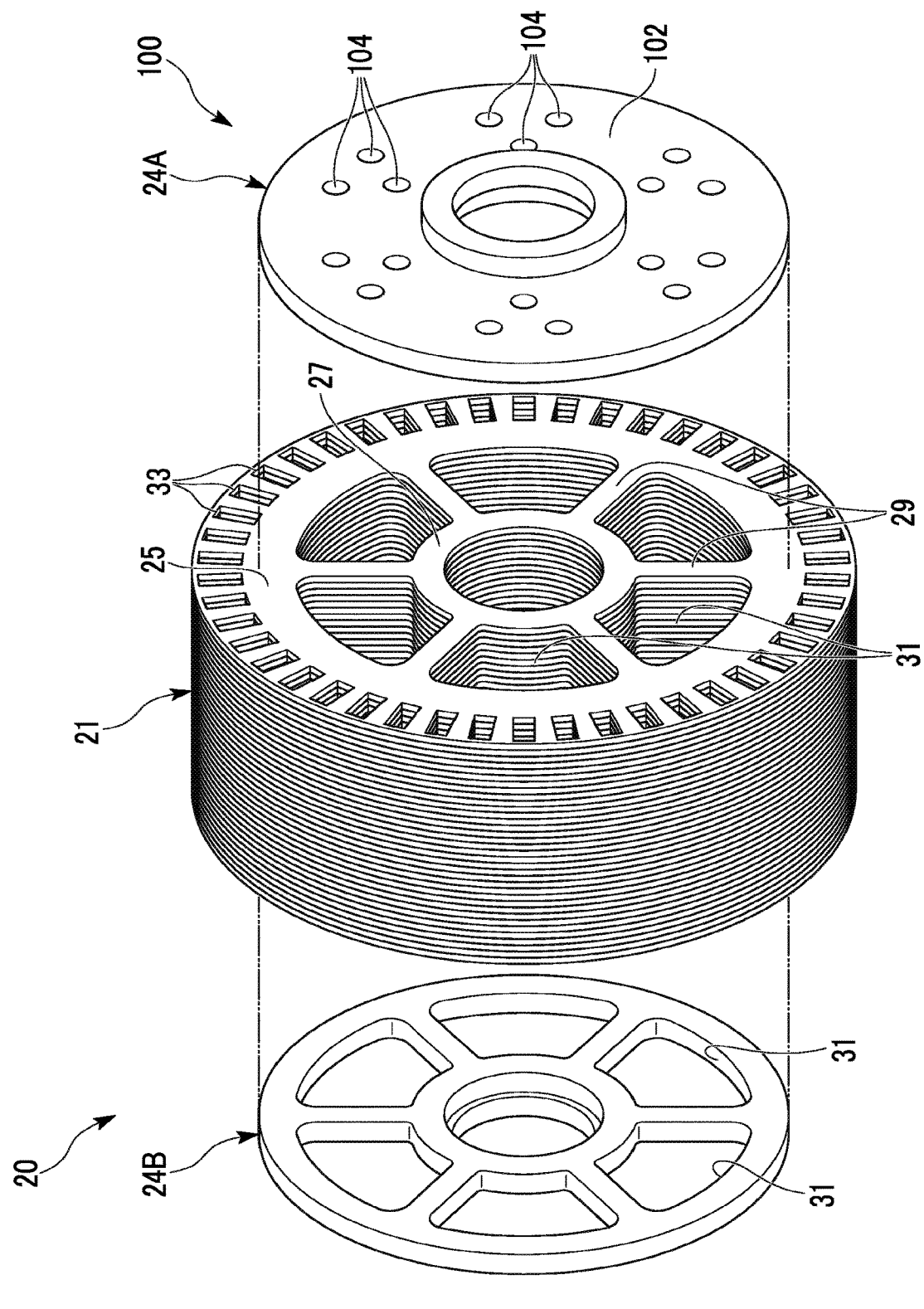
FIG. 15 is a partly exploded perspective view illustrating a rotor of the fifth embodiment.

FIG. 15 is a partly exploded perspective view illustrating a rotor 20 of the present embodiment. For convenience of description, in FIG. 15, rotor bars 35 and end rings are not illustrated.

As illustrated in FIG. 15, in the present embodiment, as an example of the case where the wind control structure 100 is provided in the vicinity of the rotor core 21, the wind control structure 100 is provided on the first pressing plate 24A. The wind control structure 100 of the present embodiment has a cover 102 that covers at least some of gaps 31 of the rotor core 21 in the axial direction Z, and a plurality of through-holes 104 that are provided in the cover 102. The plurality of through-holes 104 communicate with the gaps 31 of the rotor core 21. When viewed in the axial direction Z, each of the through-holes 104 is smaller than the gap 31 of the rotor core 21. The sum of opening areas of the plurality of through-holes 104 is smaller than the sum of opening areas of the plurality of gaps 31 of the rotor core 21. Meanwhile, a plurality of gaps 31 are provided in the second pressing plate 24B. Each of the gap 31 of the second pressing plate 24B is formed in substantially the same shape as, for example, the gap 31 of the rotor core 21.

Next, an operation of the wind control structure 100 of the present embodiment will be described.

As illustrated in FIG. 14, some cooling air that flows in the housing 5 toward the gaps 31 of the rotor core 21 flows from the through-holes 104 into the gaps 31 of the rotor core 21 in the first pressing plate 24A. On the other hand, the rest of the cooling air that flows in the housing 5 toward the gaps 31 of the rotor core 21 collides with the cover 102 in the first pressing plate 24A, and a flow direction thereof is changed. The rest of the cooling air whose flow direction has been changed flows to a gap g between a stator core 11 and the rotor core 21. For example, the wind control structure 100 changes the flow direction of the cooling air that flows in the housing 5 such that an amount of the cooling air that flows to the gap g between the stator core 11 and the rotor core 21 is more than that of the cooling air that flows from the through-holes 104 to the gaps 31 of the rotor core 21.

The cooling air that flows to the gaps 31 of the rotor core 21 flows into the rotor core 21, thereby cooling the rotor core 21. The cooling air that flows into the rotor core 21 is exhausted from the second vent holes 5b to the outside of the housing 5 through the gaps 31 of the second pressing plate 24B. On the other hand, the cooling air that flows to the gap g between the stator core 11 and the rotor core 21 flows into the gap g between the stator core 11 and the rotor core 21, thereby cooling both of the stator core 11 and the rotor core 21. The cooling air that flows into the gap g between the stator core 11 and the rotor core 21 is exhausted from the second vent holes 5b to the outside of the housing 5.

Here, during driving of the motor 1, a temperature is increased especially in the vicinity of stator coils 13 of a stator 10 or the rotor bars 35 of a rotor 20. For this reason, as much cooling air as possible is desirably supplied to the gap g between the stator core 11 and the rotor core 21.

However, in view of reducing weight, in the case where a relatively large gap 31 is provided between neighboring spokes 29 of the rotor core 21, most of the cooling air that flows in the housing 5 flows into the gaps 31 between the spokes 29, and it may be difficult for the cooling air to be supplied to the gap g between the stator core 11 and the rotor core 21.

Thus, in the present embodiment, the wind control structure 100 changes a flow of at least some of the cooling air, which heads to the gap 31 between the neighboring spokes 29, toward the gap g between the rotor core 21 and the stator core 11. Thereby, even in the case where the relatively large gaps 31 are provided between the spokes 29, cooling performance of the motor 1 can be enhanced.

Next, some modifications of the fifth embodiment will be described.

(First Modification)

Figure 16:
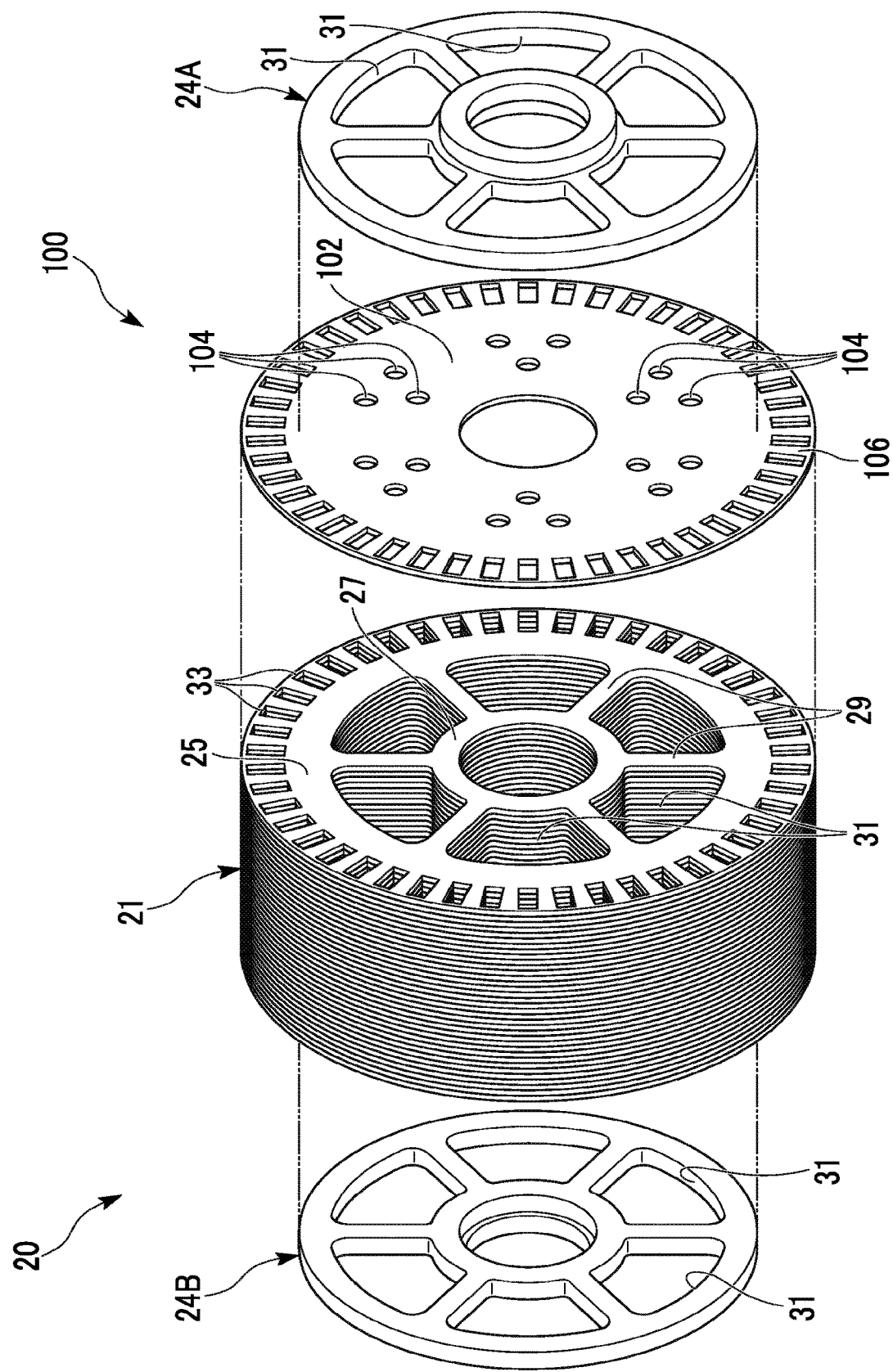
FIG. 16 is a partly exploded perspective view illustrating a rotor of a first modification of the fifth embodiment.

FIG. 16 is a sectional view illustrating a motor 1 of a first modification.

As illustrated in FIG. 16, in the present modification, a wind control structure 100 is provided on a magnetic steel sheet (a laminated steel sheet) 106 that forms a part of a rotor core 21. To be specific, the wind control structure 100 of the present modification is provided on one or more magnetic steel sheets 106 that are located an upstream end of the rotor core 21 in a flow direction of cooling air. For example, like the first pressing plate 24A of the fifth embodiment, the magnetic steel sheet 106 has a cover 102 and through-holes 104.

Meanwhile, in the present modification, a plurality of gaps 31 are also provided in a first pressing plate 24A. The gaps 31 of the first pressing plate 24A are formed in substantially the same shape as, for example, the gaps 31 of the rotor core 21. Here, a thickness of the first pressing plate 24A in the axial direction Z is generally thicker than that of the magnetic steel sheet 106. For this reason, the cover 102 is provided on the magnetic steel sheet 106, and the relatively large gaps 31 are provided in the first pressing plate 24A. Thereby, a reduction in weight of the motor 1 can be further achieved.

(Second Modification)

Figure 17:
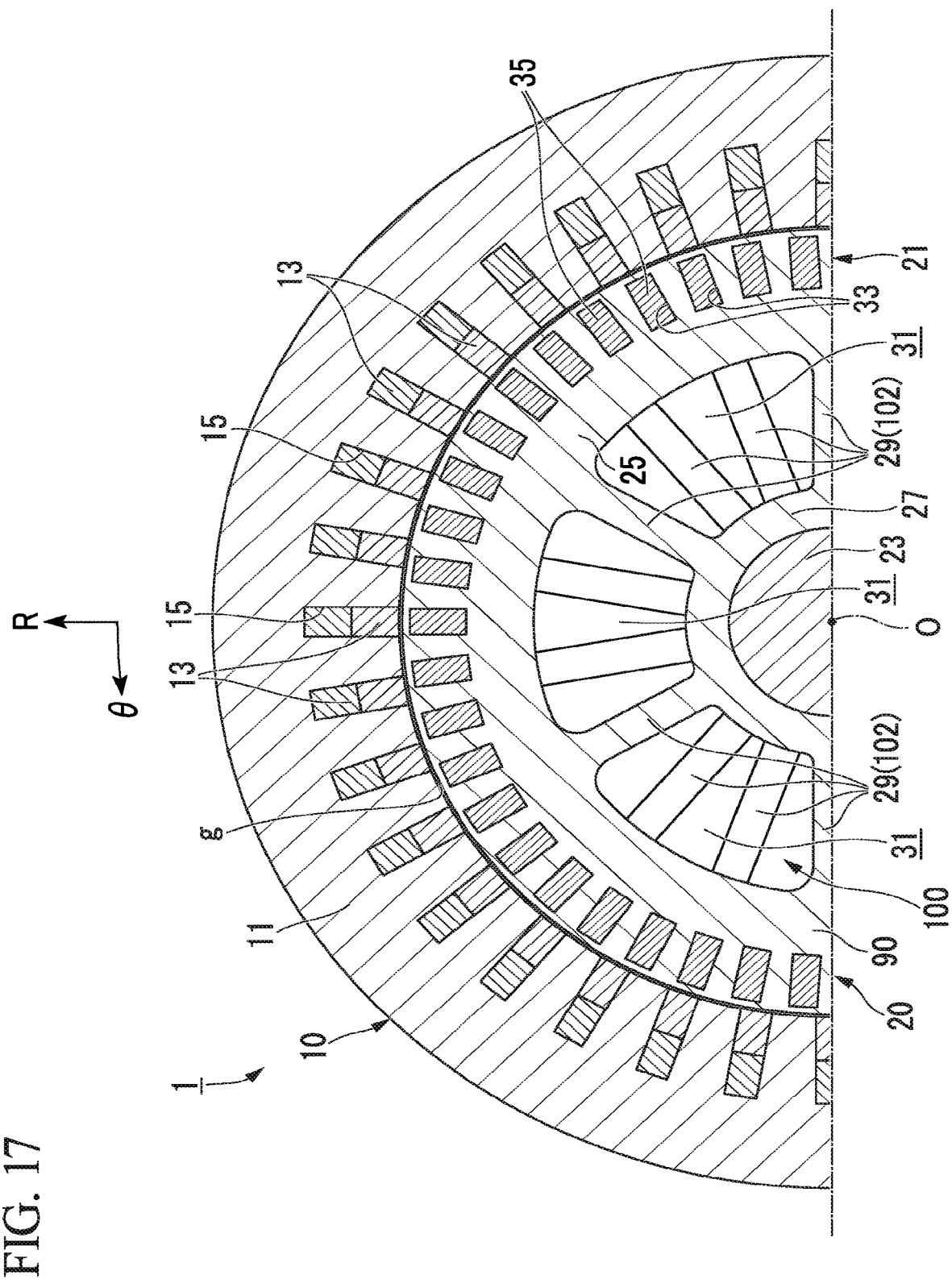
FIG. 17 is a sectional view illustrating a motor of a second modification of the fifth embodiment.

FIG. 17 is a sectional view illustrating a motor 1 of a second modification.

As illustrated in FIG. 17, as in the fourth embodiment, a rotor core 21 of the present modification has a plurality of members 90 that overlap one another in the axial direction Z and form a part of a yoke 25. The members 90 are for example magnetic steel sheets that are stacked in axial direction Z to form the rotor core 21. Each of the plurality of members 90 has spokes 29. The spokes 29 of the plurality of members 90 are arranged at positions that are at least partly different from one another in the circumferential direction θ. Thereby, a gap 31 between the spokes 29 is covered by another spoke 29, and a substantial opening area thereof when viewed in the axial direction Z becomes small. In other words, the spoke 29 that covers the gap 31 in the axial direction Z forms an example of the cover 102. For this reason, the cooling air is difficult to flow into the gap 31 between the spokes 29. That is, in the present modification, an example of the wind control structure 100 is formed by the plurality of spokes 29 arranged at the positions that are at least partly different from one another in the circumferential direction θ.

(Third Modification)

Figure 18:
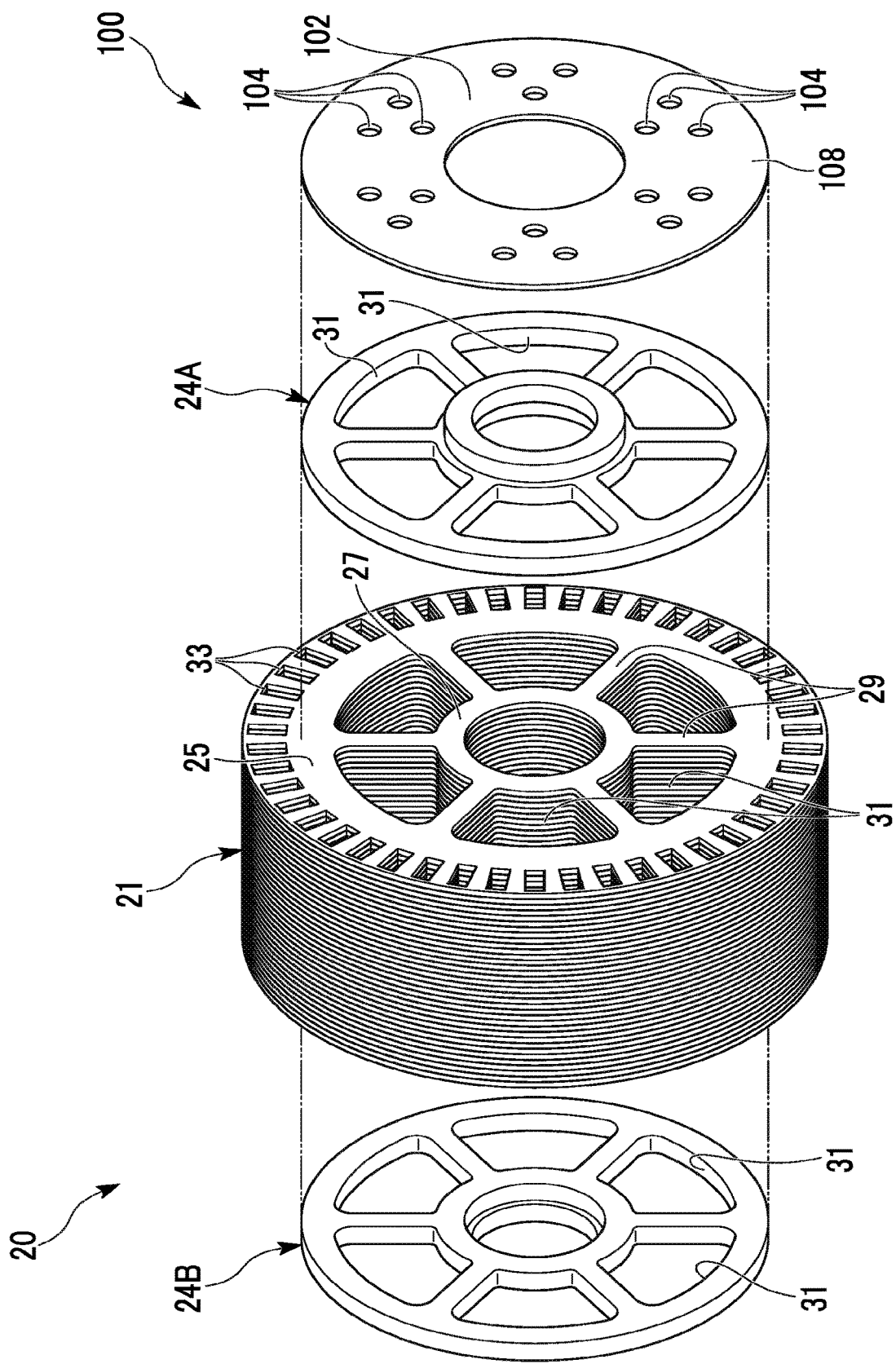
FIG. 18 is a partly exploded perspective view illustrating a rotor of a third modification of the fifth embodiment.

FIG. 18 is a partly exploded perspective view illustrating a rotor 20 of the present embodiment. For convenience of description, in FIG. 18, rotor bars 35 and end rings are not illustrated.

As illustrated in FIG. 18, in the present modification, a wind control plate 108 acting as a separate member is mounted on a first pressing plate 24A. The wind control plate 108 has a cover 102 and through-holes 104, and forms an example of the wind control structure 100. Meanwhile, a plurality of gaps 31 are provided in the first pressing plate 24A of the present modification. The gaps 31 of the first pressing plate 24A are formed, for example, in substantially the same shape as gaps 31 of a rotor core 21.

As in the fifth embodiment, even in the case where a relatively large gap 31 is provided between spokes 29, cooling performance of the motor 1 can be enhanced by the constitutions of the first to third modifications.

Sixth Embodiment

Next, a sixth embodiment will be described with reference to FIGS. 19 to 21.

The present embodiment is different from the first embodiment in that lightening parts 40 are provided on a rotor core 21. Constitution other than that to be described below are the same as in first embodiment.

Figure 19:
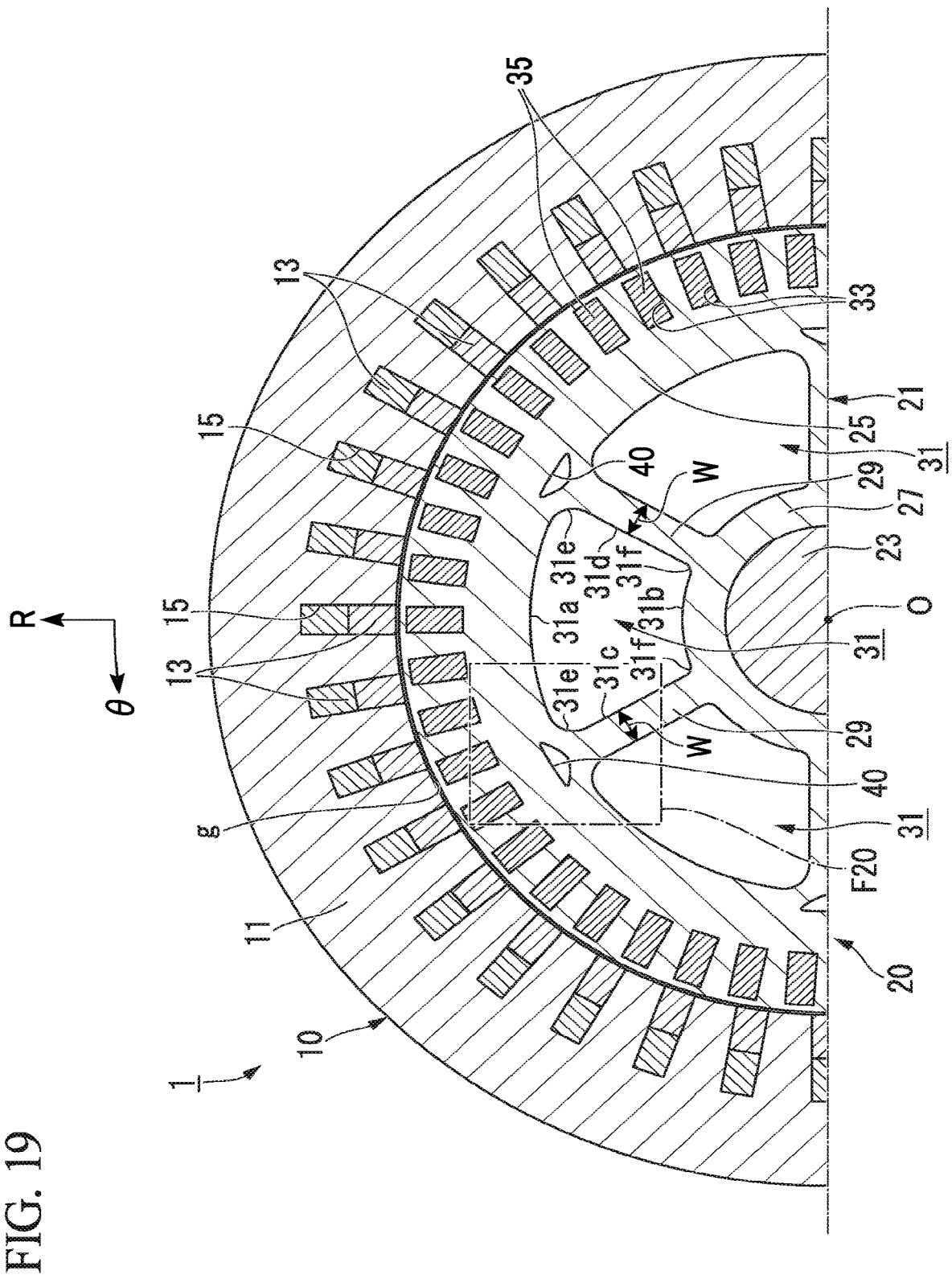
FIG. 19 is a sectional view illustrating a motor of a sixth embodiment.

FIG. 19 is a sectional view illustrating a motor 1 of the present embodiment.

As illustrated in FIG. 19, the lightening parts 40 are formed on extension lines of spokes 29 in the rotor core 21. Further, "on extension lines of spokes in the rotor core" is for example on extension lines of the central lines C (see FIG. 20) of the spokes 29. Further, "the central lines C of the spokes 29" are central lines C that pass through the centers of the spokes 29 in the circumferential direction θ and extend in longitudinal direction of the spokes 29 (substantially parallel to the radial direction R in the present embodiment). However, "on extension lines of spokes in the rotor core" is not limited to the above example, and may be on extension lines that extend portions that exclude the central lines C from the spokes 29 in the longitudinal direction of the spokes 29.

Figure 20:
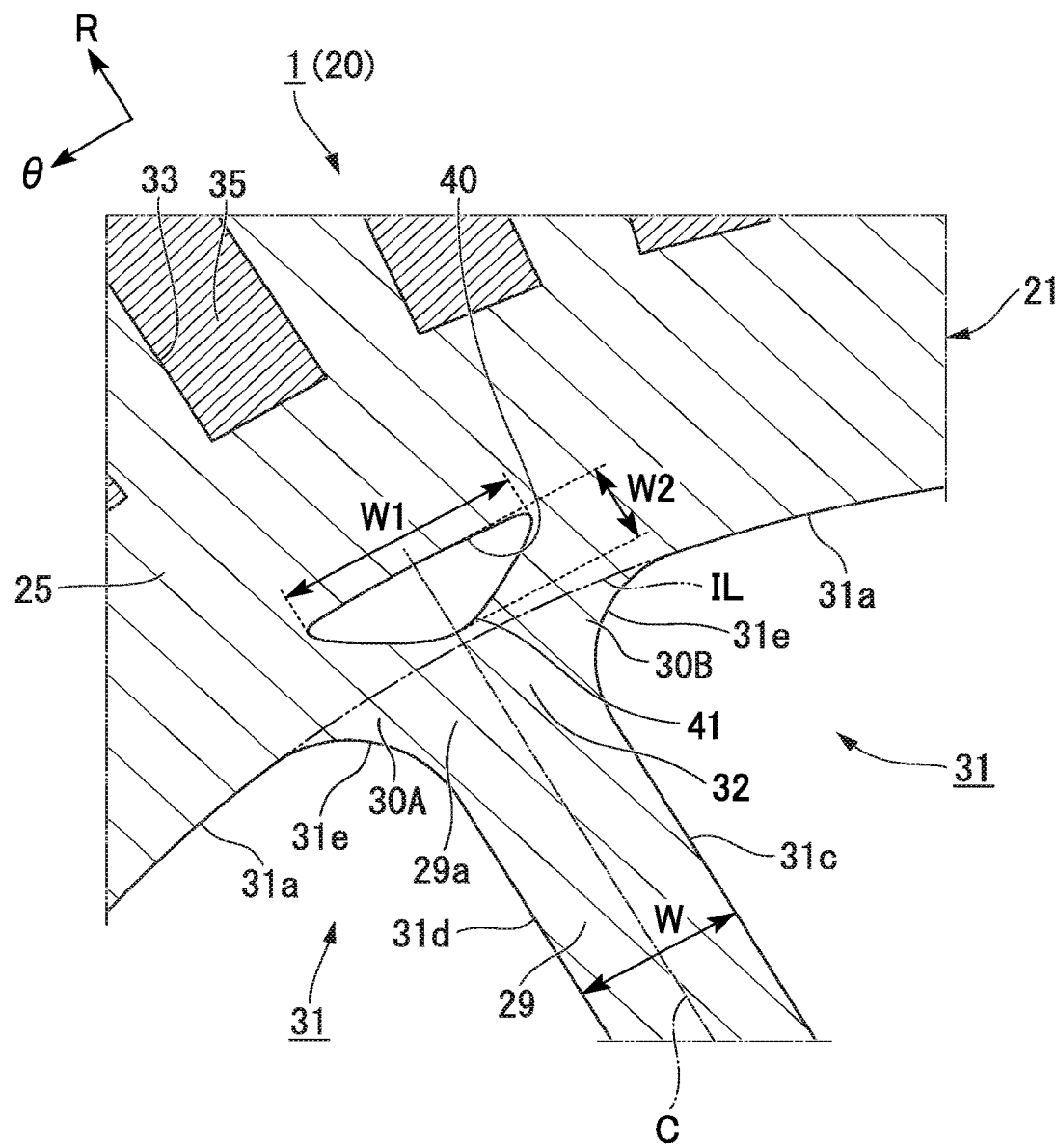
FIG. 20 is an exploded sectional view illustrating a region surrounded by a line F20 of the motor illustrated in FIG. 19.

FIG. 20 is an exploded sectional view illustrating a region surrounded by a line F20 of the motor 1 which is illustrated in FIG. 19. As illustrated in FIG. 20, in the present embodiment, a portion of the lightening part 40 which is located close to a rotor bar 35, that is, a portion located outside in the radial direction R, is located outside the gap 31 in the radial direction R. In the present embodiment, the lightening part 40 is located outside a virtual line IL, which is connected between arcuate portions 31a of two gaps 31 adjacent to each other, in the radial direction R. In other words, the lightening part 40 is provided at a position (i.e., a yoke 25) outside the spoke 29 in the radial direction R without entering the spoke 29. The position at which the lightening part 40 is formed is not limited to the above example. For example, in the case where sufficient rigidity can be secured, a part of the lightening part 40 may be provided within the spoke 29.

Meanwhile, the lightening part 40 is disposed away from the rotor bar 35 at a sufficient distance so as not to interfere with magnetic flux passing through the rotor core 21. For example, the lightening part 40 is disposed at a position closer to the spoke 29 than to the rotor bar 35 in the yoke 25. In the present embodiment, the lightening part 40 is disposed in the vicinity of the spoke 29. An core portion through which the magnetic flux passes is provided between the lightening part 40 and the rotor bar 35.

Each of the lightening parts 40 passes through the rotor core 21 in the axial direction Z. When viewed in the axial direction Z, the lightening part 40 is formed to be symmetrical with respect to the central line C of the spoke 29. In the present embodiment, an outer portion of the lightening part 40 in the radial direction R is formed to be parallel to the circumferential direction θ, and an inner portion of the lightening part 40 in the radial direction R is formed in the middle in the circumferential direction θ to swell inward in the radial direction R. In other words, the lightening part 40 of the present embodiment is formed in a substantially triangular shape. "Substantially triangular shape" mentioned herein includes a triangular shape in which sides are curved and a triangular shape in which corners are rounded.

In the present embodiment, the lightening part 40 is disposed to orient one convex (one corner) 41 toward the spoke 29. That is, the lightening part 40 is disposed to orient the convex 41 toward the inside of the yoke 25 in the radial direction R. "Convex" mentioned herein refers to, for example, a corner having a polygonal shape (a substantially triangular shape in the present embodiment). In the present embodiment, the convex 41 of the lightening part 40 is located, for example, on the extension line of the central line C of the spoke 29.

Here, a connection portion (a root portion) 29a of each of the spokes 29 to the yoke 25 has a pair of bulges 30A and 30B (a first bulge 30A and a second bulge 30B) that bulge in the direction (the circumferential direction θ) separated from the central line C of the spoke 29 as it proceeds to the outside of the yoke 25 in the radial direction R. That is, the first bulge 30A is a bulge formed by providing a corner rounded portion 31e on a corner of the gap 31 where an arcuate portion 31a and a straight portion 31d are connected. Similarly, the second bulge 30B is a bulge formed by providing a corner rounded portion 31e on a corner of the gap 31 where an arcuate portion 31a and a straight portion 31c are connected. In the present embodiment, the convex 41 of the lightening part 40 is disposed toward a region 32 between the pair of bulges 30A and 30B of the connection portion 29a of the spoke 29 for the yoke 25.

From another viewpoint, the lightening part 40 is a flat shape in which a maximum width W1 of the lightening part 40 in the circumferential direction θ is greater than a maximum width (a maximum thickness) W2 of the lightening part 40 in the radial direction R. For example, in the present embodiment, the maximum width W1 of the lightening part 40 in the circumferential direction θ is greater than a width W of the spoke 29 in the circumferential direction θ.

Figure 21:
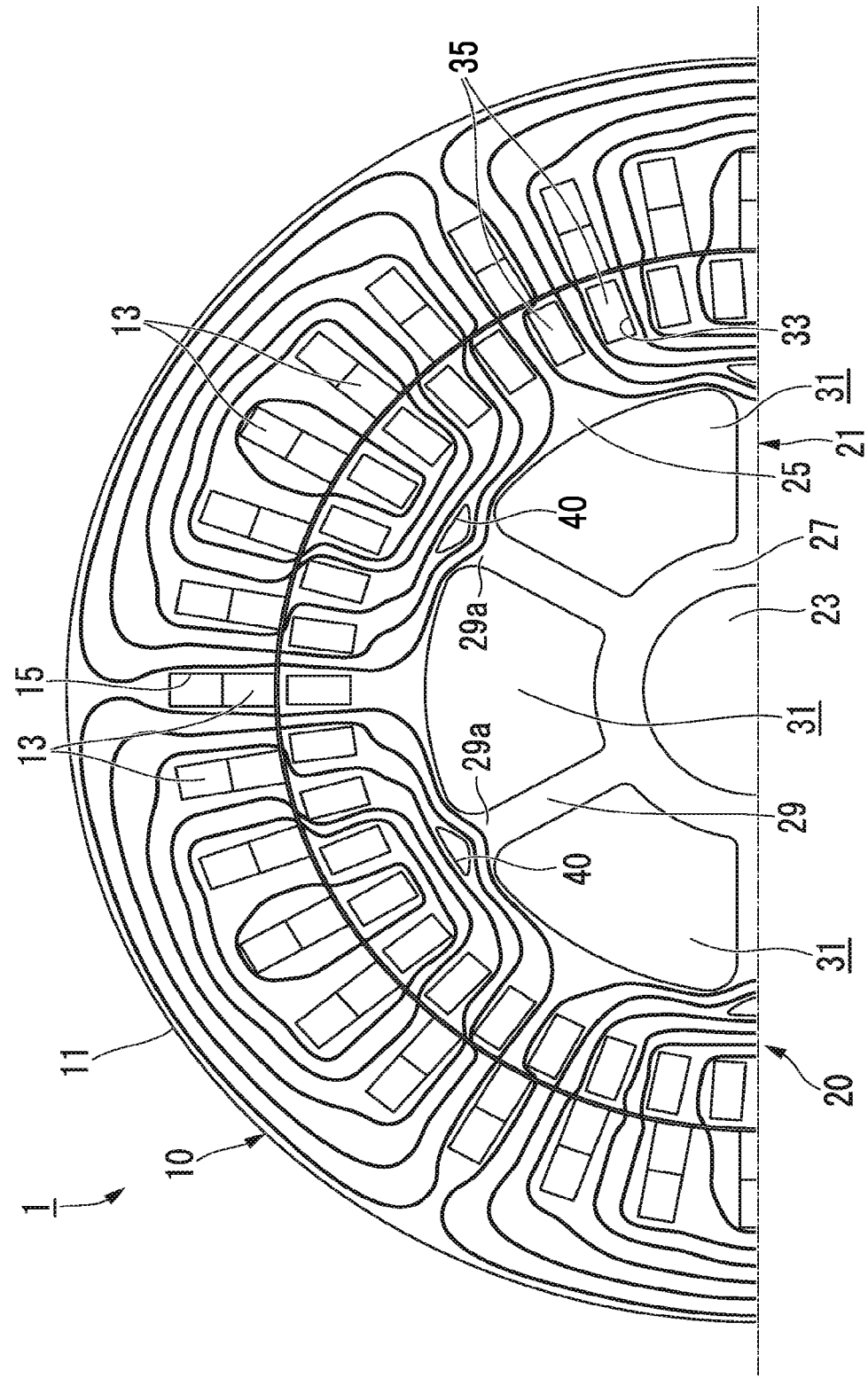
FIG. 21 is a sectional view illustrating an example of magnetic flux lines of the sixth embodiment.

FIG. 21 is a view illustrating an example of magnetic flux lines of the motor 1 of the present embodiment.

As illustrated in FIG. 21, magnetic flux generated when the stator coil 13 is energized forms closed loops around the stator coils 13. To be specific, the magnetic flux passes between the neighboring stator coils 13 adjacent in the circumferential direction θ and between the neighboring rotor bars 35 adjacent in the circumferential direction θ, and then is directed between the gap 31 and the rotor bar 35. some of the magnetic flux flowing between the gap 31 and the rotor bar 35 passes between the rotor bar 35 and the lightening part 40 in the yoke 25, and the rest passes between the gap 31 and the lightening part 40. The magnetic flux that has passed between the rotor bar 35 and the lightening part 40 and the magnetic flux that has passed between the gap 31 and the lightening part 40 pass between the neighboring rotor bars 35 adjacent in the circumferential direction θ and between the neighboring stator coils 13 adjacent in the circumferential direction θ, and then flow outside the stator coils 13 in the radial direction R in the stator core 11. In this way, the closed loop of the magnetic flux is formed.

According to the motor 1 having this constitution, a reduction in weight can be achieved while inhibiting a reduction in a magnetic property. Here, the case where the lightening parts 40 are provided on the rotor core 21 without taking specific positions into account is thought as a comparative example. In a structure of this comparative example, the lightening parts 40 are provided, and thereby magnetic flux channels in the yoke 25 are limited to perimeters of the lightening parts 40, and a raise in magnetic resistance caused by saturation of the magnetic flux occurs. When the raise in magnetic resistance occurs, a magnetic property of the motor 1 is reduced, and efficiency and torque of the motor 1 may be reduced.

Thus, in the present embodiment, the lightening parts 40 are formed on the extension lines of the spokes 29 in the rotor core 21. In this case, even if the lightening parts 40 are provided, and thereby the magnetic flux channels in the yoke 25 are limited to the perimeters of the lightening parts 40, some of the magnetic flux which passes through the yoke 25 detours the lightening parts 40 through parts of the spokes 29 (e.g., the connection portions 29a of the spokes 29) in the vicinity of the lightening parts 40, and thereby can pass the perimeters of the lightening parts 40 without saturating the vicinity of the lightening parts 40. For this reason, according to the constitution of the present embodiment, even in the case where the lightening parts 40 are provided, the magnetic property of the motor 1 is difficult to be reduced. Thereby, a reduction in weight of the motor 1 can be achieved while inhibiting a reduction in a magnetic property of the motor 1.

Here, the connection portion 29a of the spoke 29 to the yoke 25 has the bulges 30A and 30B in order to reduce stress concentration or the like on the corners or the like of the gap 31. When these bulges 30A and 30B are provided, the motor 1 becomes heavy so much. However, according to the constitution of the present embodiment, the lightening part 40 is provided in the vicinity of the spoke 29 using the bulges 30A and 30B, and thereby a reduction in weight of the motor 1 is achieved. From another viewpoint, even in the case where the lightening parts 40 are provided on the rotor core 21, a mechanical strength of the rotor core 21 is highly maintained by the bulges 30A and 30B. Thereby, the motor 1 that is excellent in both aspects of the mechanical strength and the weight reduction can be provided.

In the present embodiment, the lightening part 40 has a substantially triangular shape. According to this constitution, the magnetic flux branches off into both sides of the lightening part 40 and easily passes through them. For this reason, even in the case where the lightening parts 40 are provided, a reduction in a magnetic property of the motor 1 can be further inhibited.

In the present embodiment, the lightening part 40 has a shape that includes the convex 41 directed toward the spoke 29. According to this constitution, even in the case where an area of the lightening part 40 is relatively increased by providing the convex 41 on the lightening part 40, some of the magnetic flux passes through the connection portion 29a of the spoke 29 between the lightening part 40 and the spoke 29, in both of which the convex 41 is present, and thereby can detour the lightening part 40. Thereby, the areas of the lightening parts 40 are increased, and thereby a reduction in weight of the motor 1 can be further achieved, and a reduction in a magnetic property of the motor 1 can be inhibited.

In the present embodiment, the lightening part 40 has a substantially triangular shape in which the convex 41 is directed to the spoke 29. According to this constitution, since the convex (the corner) of the lightening part 40 is not present between the lightening part 40 and the rotor bar 35, it is more difficult for the saturation of the magnetic flux to occur between the lightening part 40 and the rotor bar 35. Meanwhile, some of the magnetic flux passes through the connection portion 29a of the spoke 29 between the lightening part 40 and the spoke 29, in both of which the convex 41 is present, and thereby can detour the lightening part 40. Thereby, a reduction in a magnetic property of the motor 1 can be further inhibited.

In the present embodiment, the convex 41 of the lightening part 40 is directed toward the region 32 between the pair of bulges 30A and 30B. According to this constitution, some of the magnetic flux passes through the bulges 30A and 30B of the spoke 29 between the lightening part 40 and the spoke 29, in both of which the convex 41 is present, and thereby can detour the lightening part 40 through a part of the spoke 29. Thereby, it is further difficult for the magnetic flux to be saturated on the perimeter of the lightening part 40, and a reduction in a magnetic property of the motor 1 can be further inhibited.

In the present embodiment, the lightening part 40 has a flat shape in which the maximum width W1 thereof in the circumferential direction θ is greater than the maximum width W2 thereof in the radial direction R. According to this constitution, since the maximum width W2 of the lightening part 40 in the radial direction R is relatively small, the lightening part 40 is difficult to interfere with the magnetic flux. On the other hand, since the maximum width W1 of the lightening part 40 in the circumferential direction θ is relatively great, a reduction in weight of the motor 1 can be further achieved.

Thereby, the motor 1 that is excellent in both aspects of the mechanical strength and the weight reduction can be provided.

In the present embodiment, the lightening part 40 is provided at the position (i.e., the yoke 25) outside the spoke 29 in the radial direction R without entering the spoke 29. According to this constitution, it is easy to secure the mechanical strength of the spoke 29. Thereby, the motor 1 that is excellent in the aspect of the strength can be provided.

For example, in the present embodiment, some of the cooling air supplied from the blower 60 into the housing 5 (or the cooling air sent from the fan mounted on the shaft 23) may flow into the lightening parts 40. Thereby, the motor 1 that is also excellent in the aspect of cooling efficiency can be provided. The lightening parts 40 are for example holes intended to reduce weight, and the cooling air may not flow thereto.

Seventh Embodiment

Next, a seventh embodiment will be described with reference to FIG. 22.

The present embodiment is different from the sixth embodiment in that the lightening parts 40 are formed in substantially circular shapes. Constitutions other than that to be described below are the same as in sixth embodiment.

Figure 22:
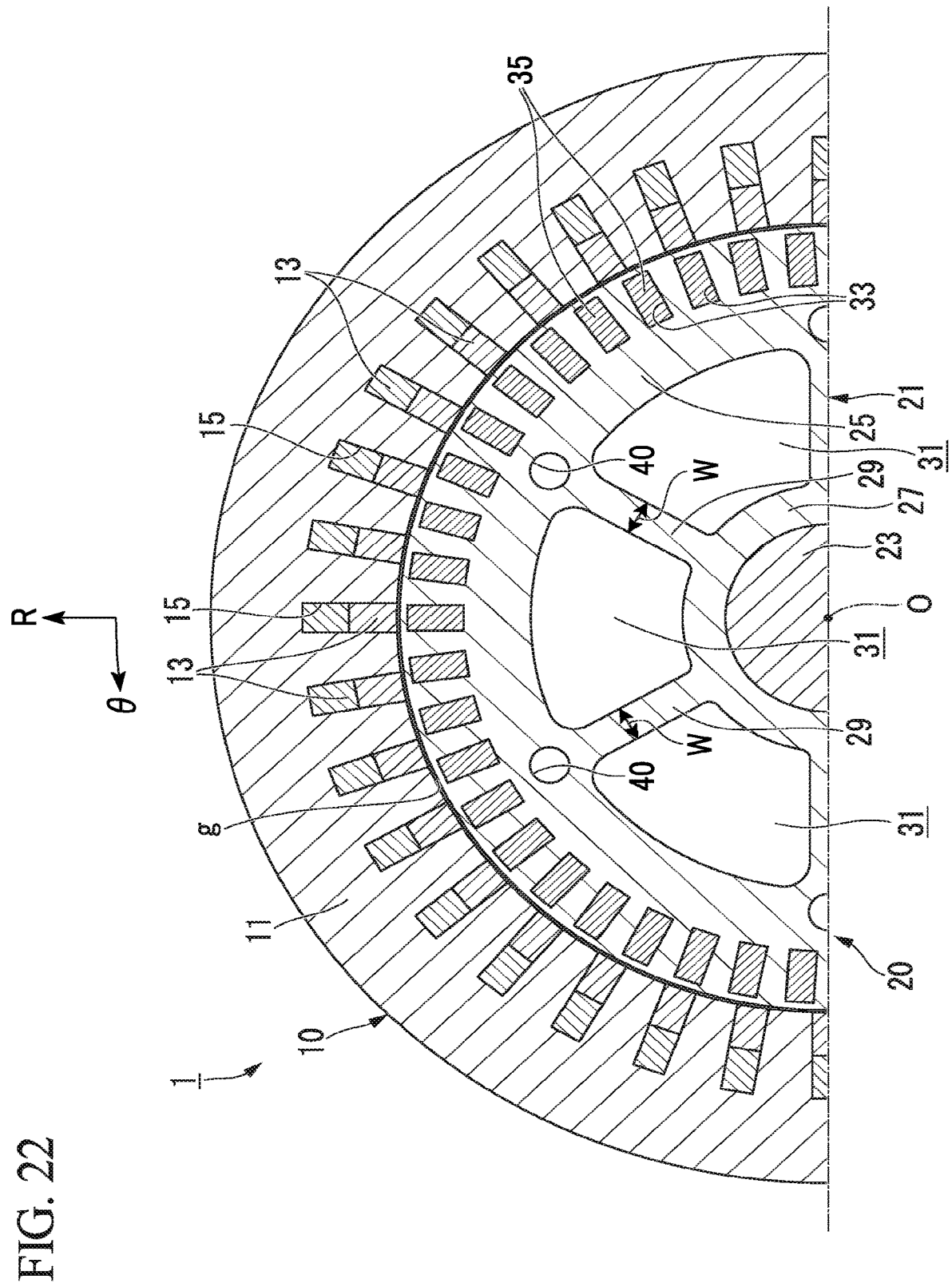
FIG. 22 is a sectional view illustrating a motor of a seventh embodiment.

FIG. 22 is a sectional view illustrating a motor 1 of a seventh embodiment.

As illustrated in FIG. 22, in a cross-sectional shape viewed in the axial direction Z, lightening parts 40 of the present embodiment are formed in substantially circular shapes. "Substantially circular shapes" mentioned herein are for example completely circular shapes, but may be oval shapes or the like instead of these shapes. In addition, "substantially circular shapes" may be flat circular shapes in which a maximum width W1 of the lightening part 40 in the circumferential direction θ is greater than a maximum width W2 of the lightening part 40 in the radial direction R.

According to this constitution, as in the sixth embodiment, a reduction in weight of the motor 1 can be achieved while inhibiting a reduction in a magnetic property. Furthermore, in the present embodiment, the lightening parts 40 are formed in substantially circular shapes. According to this constitution, areas of the lightening parts 40 can be secured to be relatively large. Thereby, a reduction in weight of the motor 1 can be further achieved.

Eighth Embodiment

Next, an eighth embodiment will be described with reference to FIG. 23.

The present embodiment is different from the sixth embodiment in that arrangement positions of lightening parts 40 are set to satisfy predetermined conditions. Here, description will be made on behalf of the arrangement position of one of the lightening parts 40, but all the lightening parts 40 provided on a rotor core 21 may be set to satisfy conditions given below. Constitutions other than that to be described below are the same as in the sixth embodiment.

Figure 23:
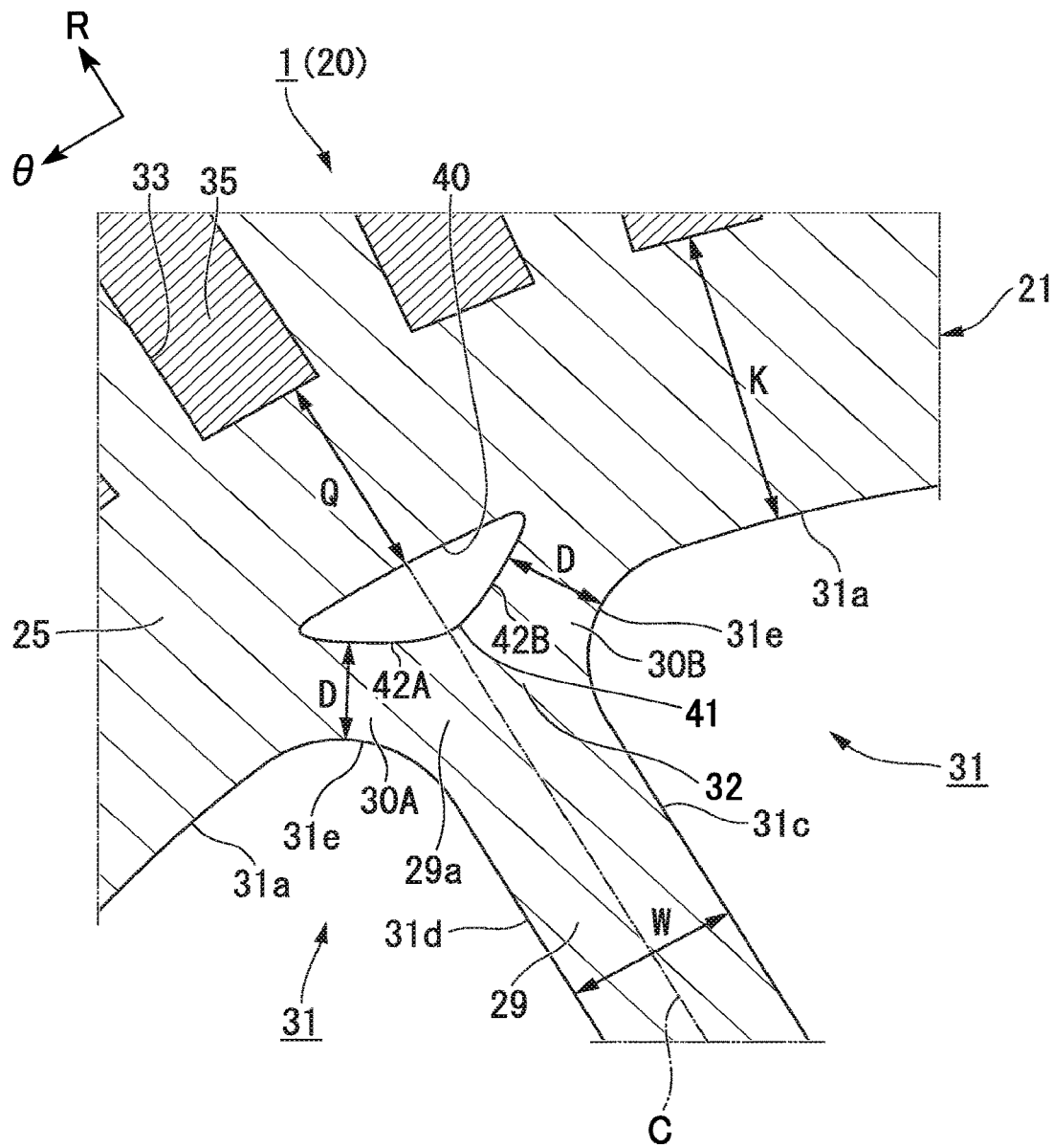
FIG. 23 is a partly exploded sectional view illustrating a motor of an eighth embodiment.

FIG. 23 is an enlarged sectional view illustrating a part of a motor 1 of an eighth embodiment.

As illustrated in FIG. 23, when viewed in the axial direction Z, the lightening part 40 of the present embodiment is formed to satisfy $D \geq W/2$ (hereinafter referred to as a first condition) when a shortest separation distance between a gap 31 and the lightening part 40 is D and a width of a spoke 29 in the circumferential direction θ is W.

For example, in the present embodiment, as in the sixth embodiment, a connection portion 29a of the spoke 29 to a yoke 25 has a pair of bulges 30A and 30B. The lightening part 40 has a first side 42A that faces the first bulge 30A of the spoke 29, and a second side 42B that faces the second bulge 30B of the spoke 29. The first side 42A and the second side 42B are individually formed on both sides of a convex 41 of the lightening part 40.

In the present embodiment, a distance between an edge of the first bulge 30A prescribed by a corner rounded portion 31e and the first side 42A of the lightening part 40 corresponds to the shortest separation distance D between the gap 31 and the lightening part 40. In addition, a distance between an edge of the second bulge 30B prescribed by a corner rounded portion 31e and the second side 42B of the lightening part 40 corresponds to the shortest separation distance D between the gap 31 and the lightening part 40.

Further, in the present embodiment, the lightening part 40 is formed to satisfy the first condition and D<W when the shortest separation distance between the gap 31 and the lightening part 40 is D and the width of the spoke 29 in the circumferential direction θ is W.

Further, in the present embodiment, the lightening part 40 is formed to satisfy $Q+D \geq K$ (hereinafter referred to as a second condition) when a shortest separation distance between the gap 31 and a rotor bar 35 is K and a shortest separation distance between the rotor bar 35 and the lightening part 40 is Q. The lightening part 40 may be formed to satisfy both of the first condition and the second condition or only any one of the first condition and the second condition.

In the present embodiment, a shortest separation distance K between the gap 31 and a rotor slot 33 (a rotor bar 35) is set to a distance within which a reduction in magnetic property of the rotor 20 caused by magnetic saturation does not occur. For example, the shortest separation distance K is set such that a magnetic flux density of magnetic flux flowing between the gap 31 and the rotor bar 35 when a predetermined voltage is applied to stator coils 13 in a constitution in which no lightening parts 40 are formed at the yoke 25 is equal to or lower than a saturation magnetic flux density.

According to this constitution, as in the sixth embodiment, a reduction in weight of the motor 1 can be achieved while inhibiting a reduction in a magnetic property.

Furthermore, in the present embodiment, when viewed in the axial direction Z, and when the width of the spoke 29 in the circumferential direction θ is W and the shortest separation distance between the gap 31 and the lightening part 40 is D, W and D satisfy $D \geq W/2$. According to this constitution, when the rotor core 21 is rotated, stress acting on an core portion between the lightening part 40 and the gap 31 is difficult to be excessively greater than that acting on the spoke 29. Thereby, reliability and lifespan of the motor 1 can be improved. According to this constitution, magnetic flux that passes inside the lightening part 40 in the radial direction R is hindered by the lightening part 40, occurrence of magnetic saturation between the gap 31 and the lightening part 40 can be further reliably inhibited.

In the present embodiment, the shortest separation distance D between the gap 31 and the lightening part 40 and the width W of the spoke are set to further satisfy D<W. According to this constitution, the lightening part 40 can be disposed relatively apart from the rotor bar 35. Thereby, saturation of magnetic flux between the rotor bar 35 and the lightening part 40 can be further inhibited.

Here, the magnetic flux flowing between the gap 31 and the rotor bar 35 branches off between the gap 31 and the lightening part 40 and between the rotor bar 35 and the lightening part 40. For this reason, when the magnetic saturation occurs between the gap 31 and the lightening part 40 or between the rotor bar 35 and the lightening part 40, the magnetic flux density between the gap 31 and the rotor bar 35 is reduced, compared to the case where the lightening part 40 is not formed. In the present embodiment, when the shortest separation distance between the gap 31 and the rotor bar 35 is K, and the shortest separation distance between the rotor bar 35 and the lightening part 40 is Q, K and Q satisfy $Q+D \geq K$. According to this constitution, a width of a flow of the magnetic flux can be sufficiently secured between the rotor bar 35 and the lightening part 40. Accordingly, for example, occurrence of magnetic saturation between the rotor bar 35 and the lightening part 40, and a reduction in magnetic flux density between the gap 31 and the rotor bar 35 can be inhibited.

As described above, the motor 1 according to several embodiments has been described, but the constitutions of the embodiments are not limited to the above examples. For example, the constitutions of the aforementioned embodiments and modifications can be applied by combinations thereof. In the aforementioned embodiments, the motor 1 is applied to the railroad vehicles, but it may be used for vehicles such as automobiles or for industrial machines such as winding machines of elevators. In the above embodiments, the six spokes 29 are provided. However, without being limited thereto, the number of spokes can be arbitrarily set.

Figure 24:
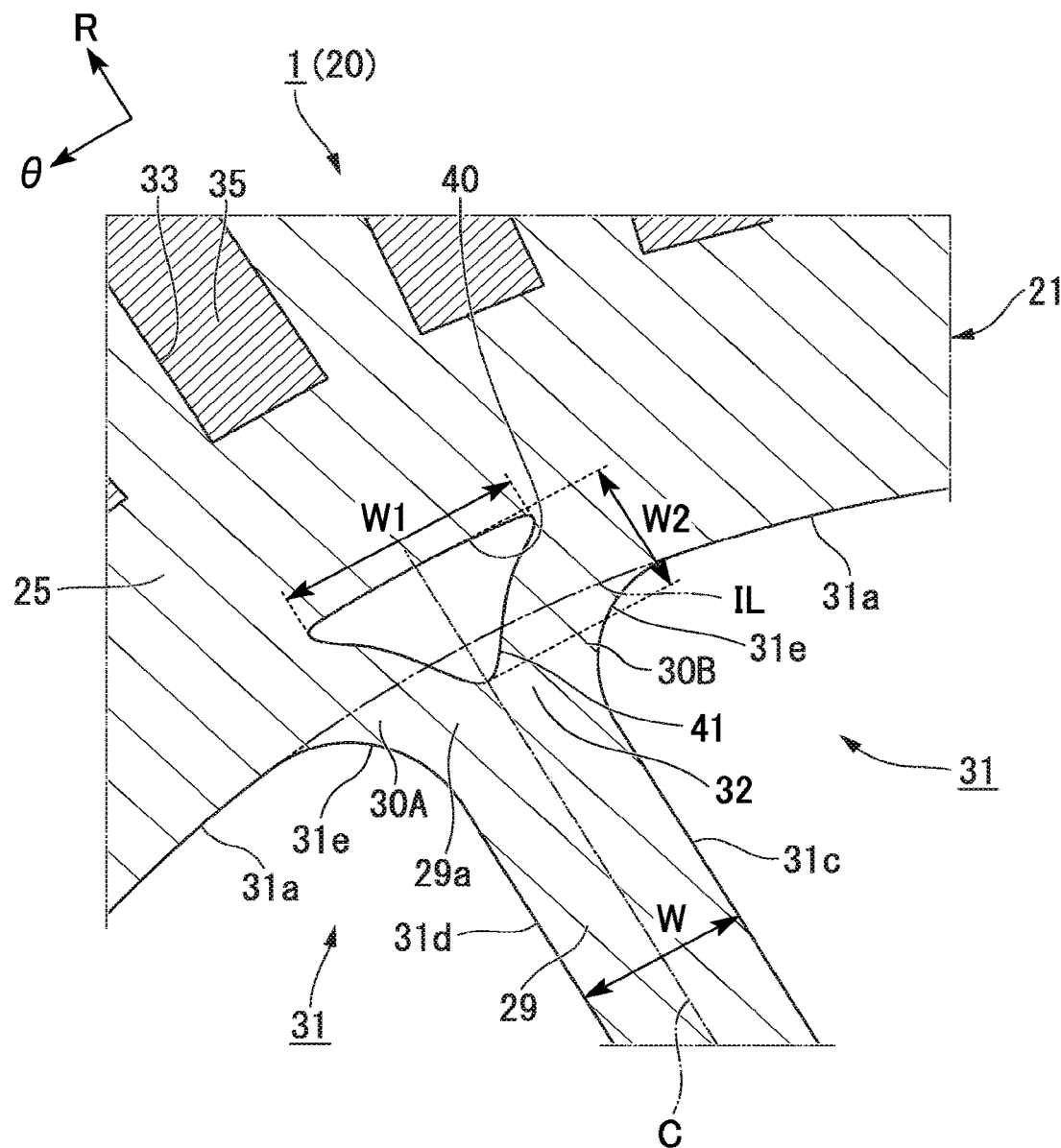
FIG. 24 is a partly exploded sectional view illustrating a motor of a modification of the embodiments.

The lightening part 40 may have, for example, a substantially triangular shape in which the convex 41 is directed outward in the radial direction R. The lightening part 40 may have shapes other than the substantially triangular shape and the substantially circular shape. In the rotor core 21, without the support 27, the spokes 29 may be directly fixed to the shaft 23. A part of the lightening part 40 (e.g., at least part of the convex 41) may be located inside the virtual line IL, which is connected between the arcuate portions 31a of the two neighboring gaps 31, in the radial direction R (see FIG. 24). In other words, a part of the lightening part 40 may enter the spoke 29, and be provided on the spoke 29. In this case, a part of the lightening part 40 may be provided on the region 32 between the pair of bulges 30A and 30B at the connection portion 29a of the spoke 29. According to this constitution, the area of the lightening part 40 can be further increased. As a result, a reduction in weight of the motor 1 can be further achieved.

Figure 25:
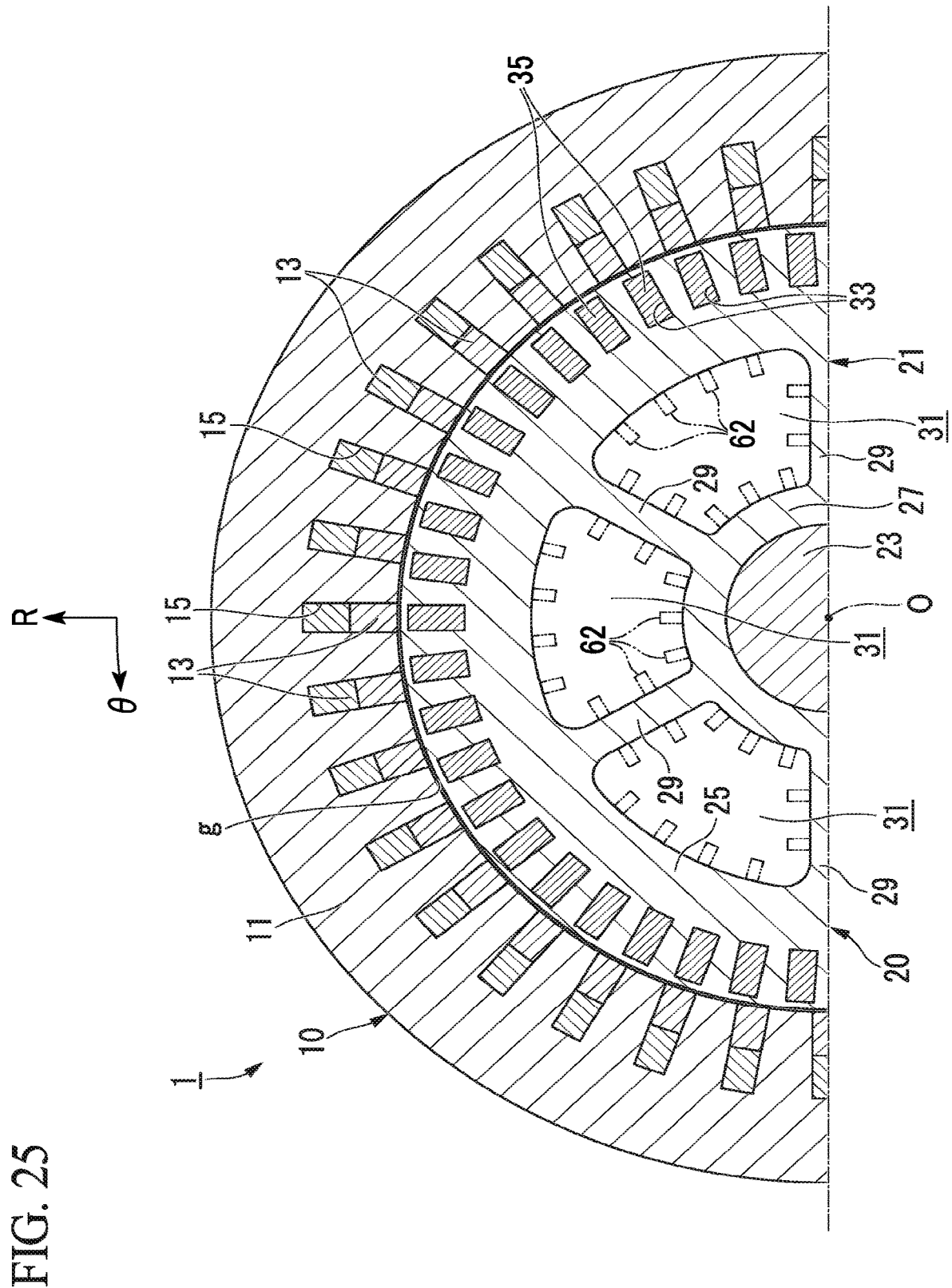
FIG. 25 is a sectional view illustrating a motor of another modification of the embodiments.

In the case where the cooling air is supplied into the gaps 31, fins 62 may be provided on inner surfaces of the gaps 31 (see FIG. 25). The fins 62 may be plate-like parts that extend in the axial direction Z, or protrusions that are provided on the inner surfaces of the gaps 31. In the case where the fins 62 are provided, cooling performance can be improved by an increase in a heat dissipation area.

Figure 26:
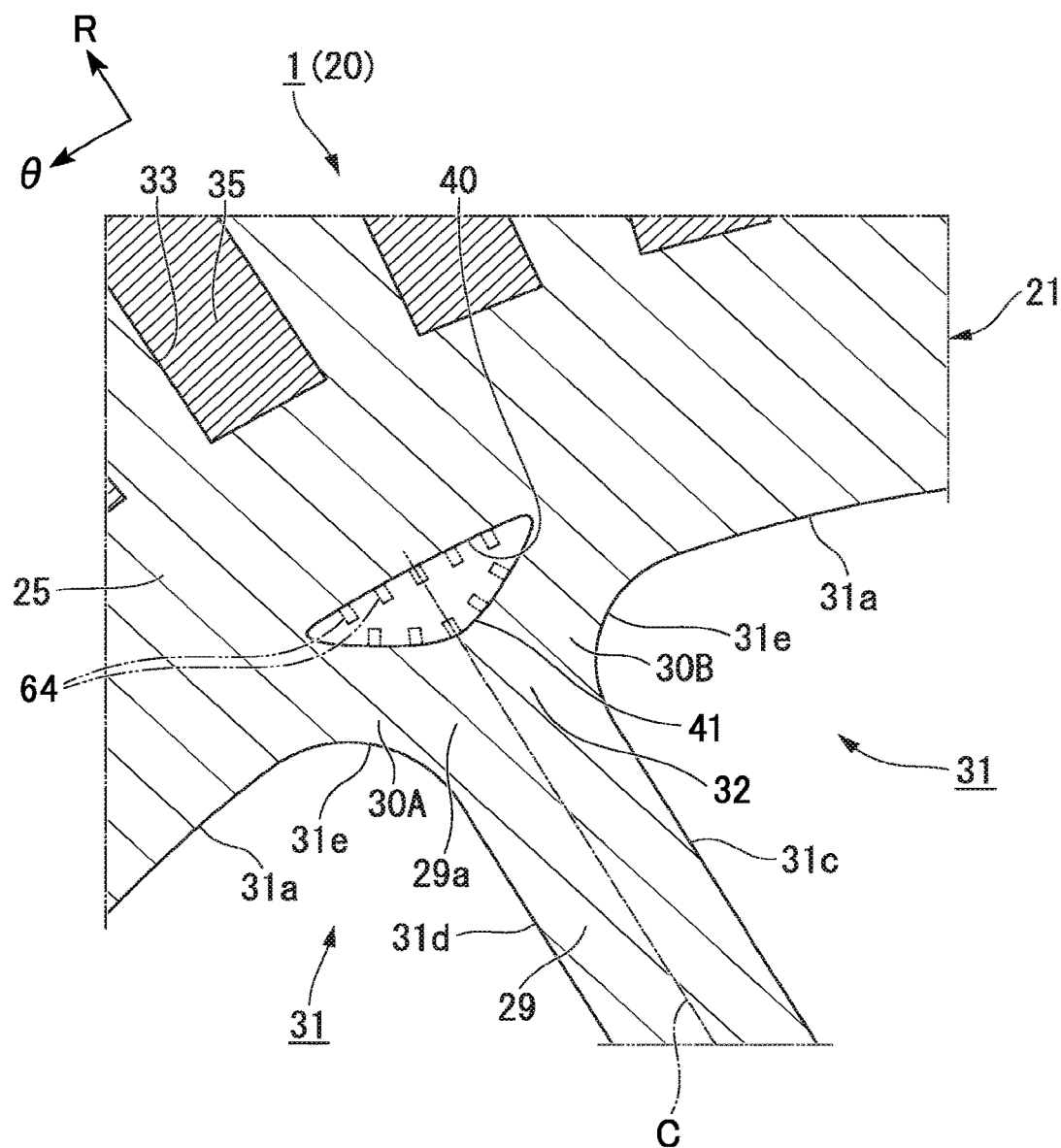
FIG. 26 is a partly exploded sectional view illustrating a motor of still another modification of the embodiments.

In the case where the cooling air is supplied into the lightening parts 40, fins 64 may be provided on inner surfaces of the lightening parts 40 (see FIG. 26). The fins 64 may be plate-like parts that extend in the axial direction Z, or protrusions that are provided on the inner surfaces of the lightening parts 40. In the case where the fins 64 are provided, cooling performance can be improved by an increase in a heat dissipation area.

According to at least one of the embodiments described above, the rotor core has the plurality of spokes that are arranged apart from one another in the circumferential direction of the yoke, are provided between the yoke and the shaft, and support the yoke, and thereby a reduction in weight of the motor can be achieved.

While several embodiments of the present invention have been described, these embodiments are presented as an example, and are not intended to limit the scope of the present invention. These embodiments can be carried out in other various modes, and various omissions, substitutions, and modifications can be performed without departing the gist of the invention. These embodiments and modification thereof are included in the invention described in the claims and the equivalent scope thereof in the same way as being included in the scope and gist of the invention.

REFERENCE SIGNS LIST

1 Motor
21 Rotor core
23 Shaft
25 Yoke
29 Spoke
29a Connection portion of the spoke to the yoke
31 Gap
35 Rotor bar (conductor)
40 Lightening part
41 Convex of the lightening part
80 Fixture
84 Support surface
91 First member
92 Second member
95 First spoke
96 Second spoke
100 Wind control structure
102 Cover
Z Axial direction
R Radial direction
θ Circumferential direction

The invention claimed is:

1. A cage induction motor comprising:
a rotor core configured to be rotatable about a central axis; and
a shaft to which the rotor core is fixed,
wherein the rotor core comprises
an annular yoke configured to support at least one conductor, and
a plurality of spokes arranged apart from one another in a circumferential direction of the yoke, the plurality of spokes being between the yoke and the shaft, and configured to support the yoke,
the rotor core comprises first and second members that overlap each other in an axial direction of the yoke, each of the first and second members forms a part of the yoke,
the plurality of spokes comprise a first spoke and a second spoke, the first spoke being formed by the first member, the second spoke being formed by the second member, and
at least a part of the first spoke and at least a part of the second spoke are arranged at positions that are different from each other in the circumferential direction.

2. The cage induction motor according to claim 1, wherein the plurality of spokes comprise two spokes that are adjacent to each other, and a gap between the two spokes has a substantially triangular shape.

3. The cage induction motor according to claim 1, wherein the number of spokes included in the plurality of spokes is a number that is an integer multiple of the number of poles of the cage induction motor.

4. The cage induction motor according to claim 1, wherein the number of spokes included in the plurality of spokes is a number that is different from an integer multiple of the number of poles of the cage induction motor.

5. The cage induction motor according to claim wherein:
the rotor core further comprises fixtures that are provided on the shaft and fix the spokes to the shaft; and
the fixtures has support surfaces that support the spokes in the circumferential direction of the yoke.

6. The cage induction motor according to claim 1, wherein the first spoke and the second spoke are inclined in directions opposite to each other in the circumferential direction of the yoke with respect to a radial direction centered on the central axis.

7. A cage induction motor comprising:
a stator core;
a rotor core configured to be rotatable about a central axis;
a shaft to which the rotor core is fixed; and
a cover;
wherein the rotor core comprises:
an annular yoke configured to support at least one conductor, and
a plurality of spokes arranged apart from one another in a circumferential direction of the yoke, the plurality of spokes being between the yoke and the shaft, and configured to support the yoke, the cover is provided at least one of on the rotor core and in a vicinity of the rotor core, and is configured to cover at least a part of a gap between two neighboring spokes included in the plurality of spokes, the cover covering the gap in an axial direction of the yoke for limiting an amount of cooling air that flows to the gap between the two neighboring spokes, the cover being configured to increase an amount of the cooling air that flows to a gap between the stator core and the rotor core by limiting the amount of the cooling air that flows to the gap between the two neighboring spokes.

8. A cage induction motor comprising:
a rotor core configured to be rotatable about a central axis; and
a shaft to which the rotor core is fixed,
wherein the rotor core comprises:
an annular yoke configured to support at least one conductor, and
a plurality of spokes arranged apart from one another in a circumferential direction of the yoke, the plurality of spokes being between the yoke and the shaft, and configured to support the yoke,
the rotor core includes lightening parts on extension lines of the spokes, at least a part of each of the lightening parts being in the yoke and being not adjacent to a gap between two neighboring spokes included in the plurality of spokes in the circumferential direction.

9. The cage induction motor according to claim 8, wherein the lightening parts have substantially triangular shapes.

10. The cage induction motor according to claim 9, wherein
the lightening parts have substantially triangular shapes in which convexes are directed to the spokes.

11. The cage induction motor according to claim 10, wherein:
the spokes have connection portions for the yoke, each of the connection portions having a pair of bulges that bulge away from central lines of the spokes as the bulges proceed toward an outside of the yoke in the radial direction; and
each of the convexes of the lightening parts is directed to a region between the pair of bulges.

12. The cage induction motor according to claim 8, wherein
the lightening parts have substantially circular shapes.

13. The cage induction motor according to claim 8, wherein
the lightening parts have flat shapes in which a maximum width thereof in the circumferential direction of the yoke is greater than a maximum width thereof in the radial direction of the yoke.

14. The cage induction motor according to claim 8, wherein when a shortest separation distance between a lightening part included in the lightening parts and a gap between two neighboring spokes included in the plurality of spokes is D, and
a width of a spoke included in the plurality of spokes in the circumferential direction of the yoke is W,
the shortest separation distance D between the lightening part and the gap and the width W of the spoke are set to satisfy $D \geq W/2$.

15. The cage induction motor according to claim 14, wherein
the shortest separation distance D between the lightening part and the gap and the width W of the spoke are set to further satisfy $D < W/2$.

16. The cage induction motor according to claim 8, wherein
when a shortest separation distance between a lightening part included in the lightening parts and a gap between two neighboring spokes included in the plurality of spokes is D,
a shortest separation distance between the gap and the conductor is K, and
a shortest separation distance between the conductor and the lightening part is Q,
the shortest separation distance D between the lightening part and the gap, the shortest separation distance K between the gap and the conductor, and the shortest separation distance Q between the conductor and the lightening part are set to satisfy $Q+D \geq K$.

17. The cage induction motor according to claim 7, wherein
the cover includes a through-hole, an opening area of the through-hole being smaller than an opening area of the gap between the two neighboring spokes.

18. The cage induction motor according to claim 7, further comprising:
a cooling structure of forced air cooling configured to supply the cooling air from an outside of the cage induction motor into an inside of the cage induction motor,
wherein the cover is configured to limit an amount of the cooling air that is supplied by the cooling structure and flows to the gap between the two neighboring spokes for increasing the amount of the cooling air that flows to the gap between the stator core and the rotor core by limiting the amount of the cooling air that flows to the gap between the two neighboring spokes.

* * * * *